US012684434B2

(12) United States Patent
Wang et al.

(10) Patent No.: US 12,684,434 B2
(45) Date of Patent: Jul. 14, 2026

(54) HANDLING REDIRECTION FAILURES IN RRC CONNECTION REDIRECTION PROCEDURE

(71) Applicant: Telefonaktiebolaget LM Ericsson (publ), Stockholm (SE)

(72) Inventors: Min Wang, Luleå (SE); Muhammad Ali Kazmi, Sundbyberg (SE); Marco Belleschi, Solna (SE); Iana Siomina, Täby (SE); Jan Christoffersson, Luleå (SE); Mai-Anh Phan, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 714 days.

(21) Appl. No.: 17/917,382

(22) PCT Filed: Apr. 9, 2021

(86) PCT No.: PCT/EP2021/059308
§ 371 (c)(1),
(2) Date: Oct. 6, 2022

(87) PCT Pub. No.: WO2021/205002
PCT Pub. Date: Oct. 14, 2021

(65) Prior Publication Data
US 2023/0156540 A1 May 18, 2023

Related U.S. Application Data

(60) Provisional application No. 63/007,609, filed on Apr. 9, 2020.

(51) Int. Cl.
H04W 36/00 (2009.01)
H04W 74/0816 (2024.01)
(Continued)

(52) U.S. Cl.
CPC . H04W 36/00835 (2018.08); H04W 36/0079 (2018.08); H04W 36/00837 (2018.08);
(Continued)

(58) Field of Classification Search
CPC ....... H04W 36/00835; H04W 36/0079; H04W 36/00837; H04W 74/0816; H04W 76/30;
(Continued)

(56) References Cited

U.S. PATENT DOCUMENTS

2013/0183981 A1* 7/2013 Singh .............. H04W 36/00835
455/437
2017/0034745 A1 2/2017 Dhanapal et al.
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.7.0, Sep. 2019, pp. 1-295.
(Continued)

*Primary Examiner* — Nizam U Ahmed
(74) *Attorney, Agent, or Firm* — Sage Patent Group

(57) ABSTRACT

Methods and apparatuses involve a network node (22) of a wireless communication network (10) and a wireless device (12) attempting redirection with respect to the network (10). An overall bound limits how many times or for how long the wireless device (12) attempts redirection and provides a mechanism for the wireless device (12) to extend its redirection efforts to one or more redirection targets beyond those indicated by the network (10).

26 Claims, 18 Drawing Sheets

(51) Int. Cl.
    *H04W 74/0833*     (2024.01)
    *H04W 74/0836*     (2024.01)
    *H04W 76/30*     (2018.01)

(52) U.S. Cl.
    CPC ....... *H04W 74/0816* (2013.01); *H04W 76/30*
        (2018.02); *H04W 74/0833* (2013.01); *H04W*
        *74/0836* (2024.01)

(58) Field of Classification Search
    CPC ... H04W 36/305; H04W 48/20; H04W 16/14;
        H04W 74/0836; H04W 76/19; H04W
        74/0833; H04W 74/0808
    See application file for complete search history.

(56)         References Cited

U.S. PATENT DOCUMENTS

| | | | |
|---|---|---|---|
| 2017/0071021 A1* | 3/2017 | Jin | H04W 76/15 |
| 2019/0123850 A1 | 4/2019 | Dinan | |
| 2020/0077314 A1* | 3/2020 | Hwang | H04W 36/362 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, 1-532.
Vodafone, "Update for the Evolved Packet System", 3GPP TSG SA WG2 Meeting #69, S2-088285, rev of 62-088033, Miami, Florida, USA, Nov. 17-21, 2008, 1-17.

* cited by examiner

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same eNB | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |
| NOTE: a prepared eNB is an eNB which has admitted the UE during an earlier executed HO preparation phase, or obtains the UE context during the Second Phase. | | | |

*FIGURE 2*

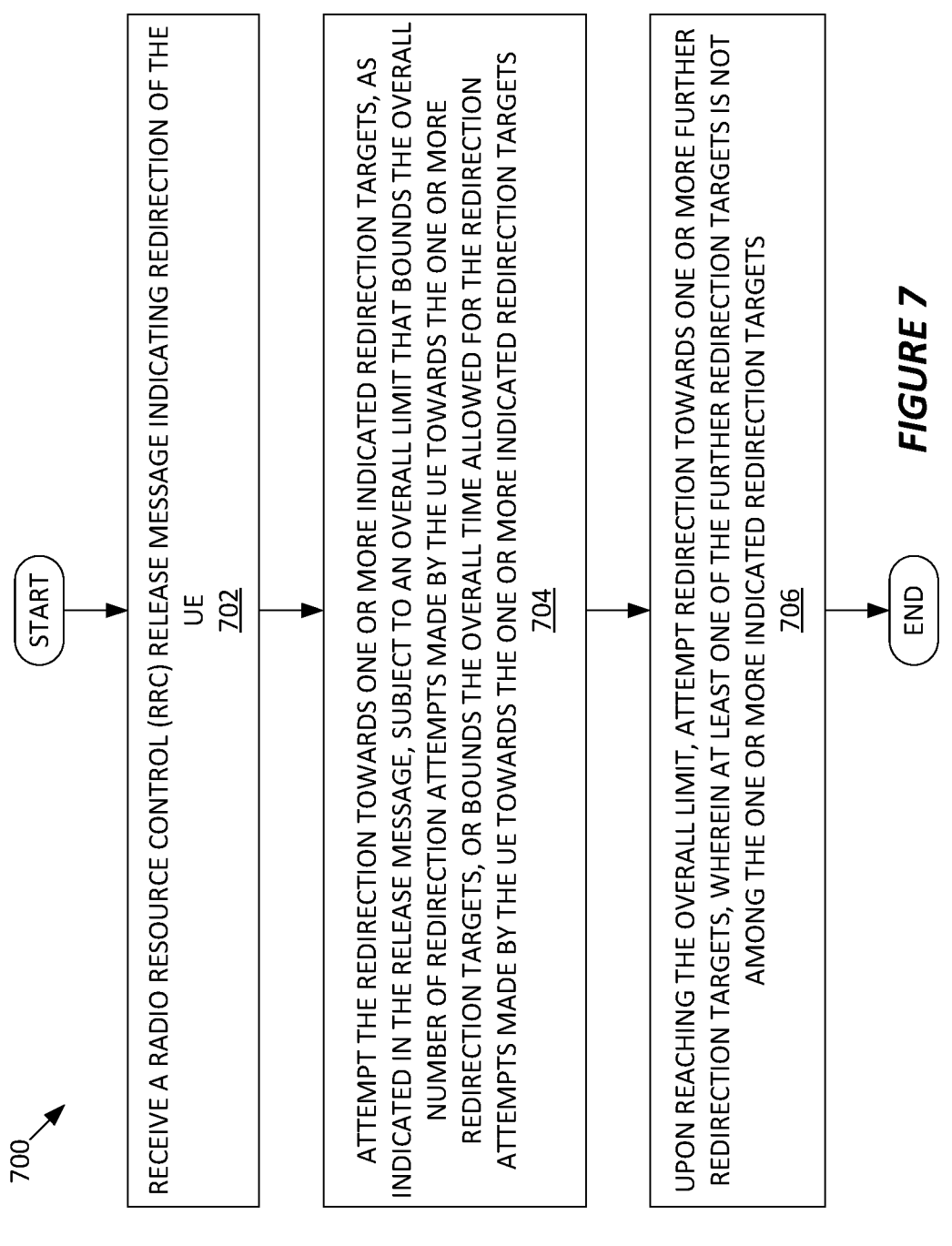

700

START

RECEIVE A RADIO RESOURCE CONTROL (RRC) RELEASE MESSAGE INDICATING REDIRECTION OF THE UE
702

ATTEMPT THE REDIRECTION TOWARDS ONE OR MORE INDICATED REDIRECTION TARGETS, AS INDICATED IN THE RELEASE MESSAGE, SUBJECT TO AN OVERALL LIMIT THAT BOUNDS THE OVERALL NUMBER OF REDIRECTION ATTEMPTS MADE BY THE UE TOWARDS THE ONE OR MORE REDIRECTION TARGETS, OR BOUNDS THE OVERALL TIME ALLOWED FOR THE REDIRECTION ATTEMPTS MADE BY THE UE TOWARDS THE ONE OR MORE INDICATED REDIRECTION TARGETS
704

UPON REACHING THE OVERALL LIMIT, ATTEMPT REDIRECTION TOWARDS ONE OR MORE FURTHER REDIRECTION TARGETS, WHEREIN AT LEAST ONE OF THE FURTHER REDIRECTION TARGETS IS NOT AMONG THE ONE OR MORE INDICATED REDIRECTION TARGETS
706

END

*FIGURE 7*

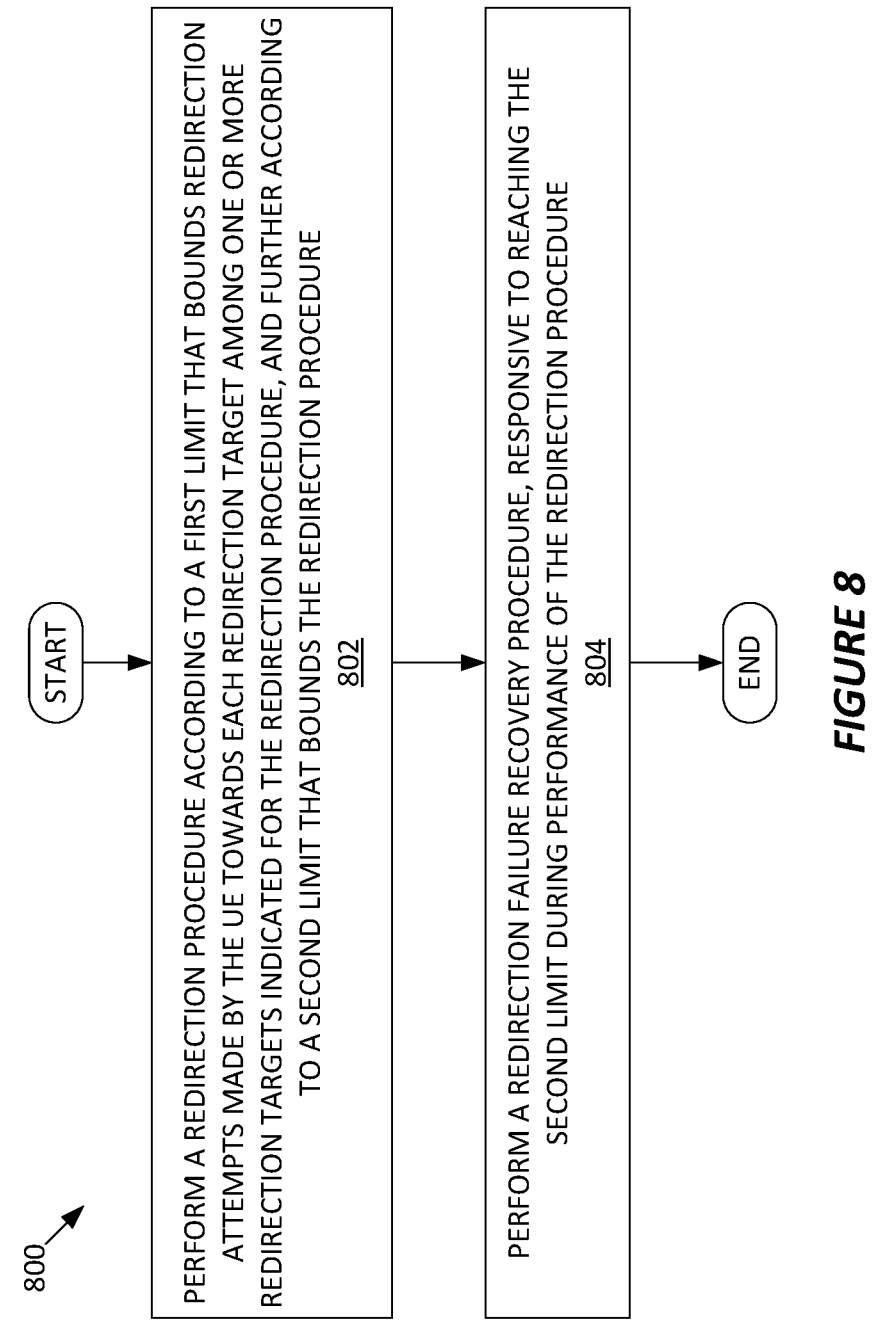

800

START

PERFORM A REDIRECTION PROCEDURE ACCORDING TO A FIRST LIMIT THAT BOUNDS REDIRECTION ATTEMPTS MADE BY THE UE TOWARDS EACH REDIRECTION TARGET AMONG ONE OR MORE REDIRECTION TARGETS INDICATED FOR THE REDIRECTION PROCEDURE, AND FURTHER ACCORDING TO A SECOND LIMIT THAT BOUNDS THE REDIRECTION PROCEDURE
802

PERFORM A REDIRECTION FAILURE RECOVERY PROCEDURE, RESPONSIVE TO REACHING THE SECOND LIMIT DURING PERFORMANCE OF THE REDIRECTION PROCEDURE
804

END

*FIGURE 8*

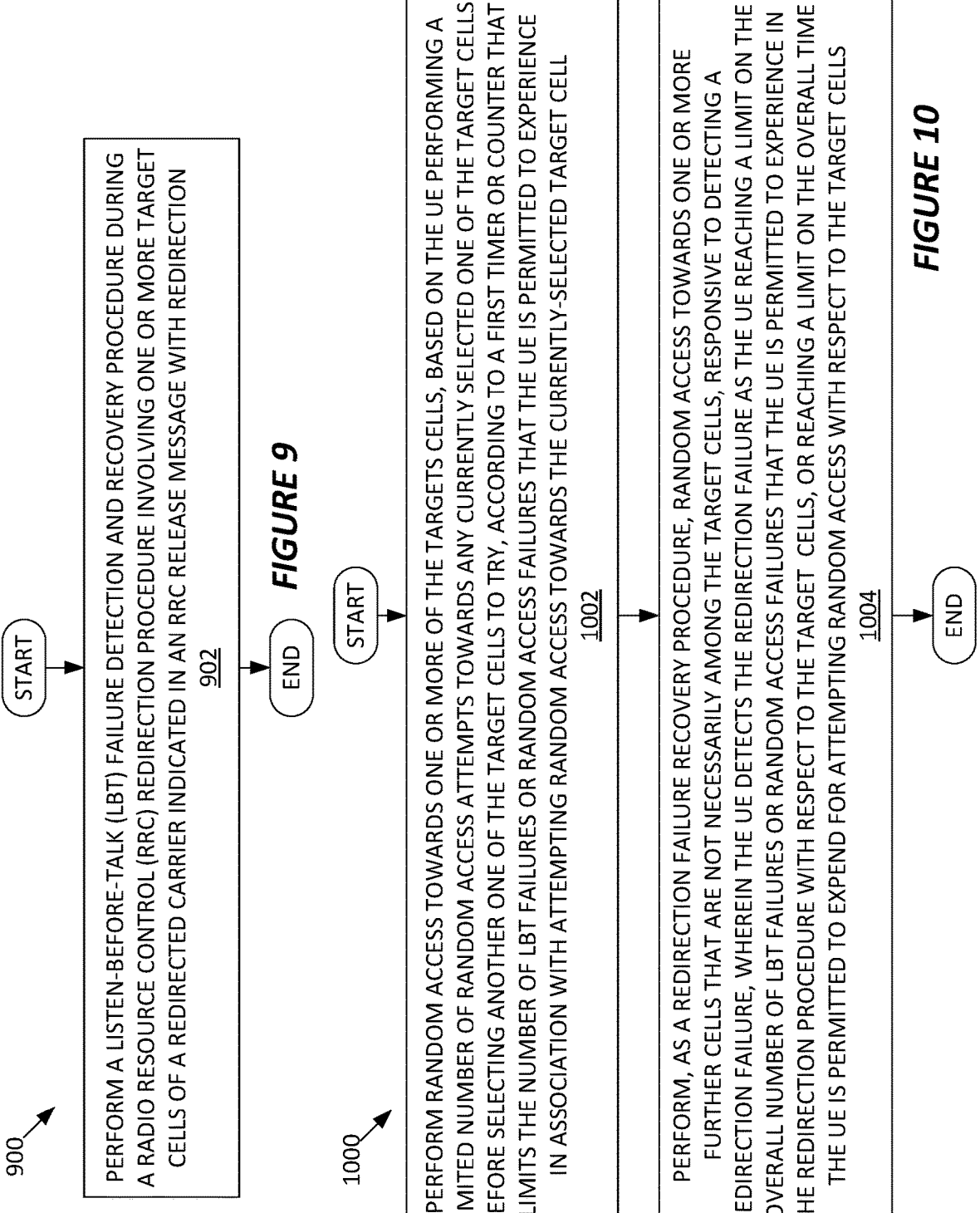

900

PERFORM A LISTEN-BEFORE-TALK (LBT) FAILURE DETECTION AND RECOVERY PROCEDURE DURING A RADIO RESOURCE CONTROL (RRC) REDIRECTION PROCEDURE INVOLVING ONE OR MORE TARGET CELLS OF A REDIRECTED CARRIER INDICATED IN AN RRC RELEASE MESSAGE WITH REDIRECTION
902

PERFORM RANDOM ACCESS TOWARDS ONE OR MORE OF THE TARGETS CELLS, BASED ON THE UE PERFORMING A LIMITED NUMBER OF RANDOM ACCESS ATTEMPTS TOWARDS ANY CURRENTLY SELECTED ONE OF THE TARGET CELLS BEFORE SELECTING ANOTHER ONE OF THE TARGET CELLS TO TRY, ACCORDING TO A FIRST TIMER OR COUNTER THAT LIMITS THE NUMBER OF LBT FAILURES OR RANDOM ACCESS FAILURES THAT THE UE IS PERMITTED TO EXPERIENCE IN ASSOCIATION WITH ATTEMPTING RANDOM ACCESS TOWARDS THE CURRENTLY-SELECTED TARGET CELL
1002

PERFORM, AS A REDIRECTION FAILURE RECOVERY PROCEDURE, RANDOM ACCESS TOWARDS ONE OR MORE FURTHER CELLS THAT ARE NOT NECESSARILY AMONG THE TARGET CELLS, RESPONSIVE TO DETECTING A REDIRECTION FAILURE, WHEREIN THE UE DETECTS THE REDIRECTION FAILURE AS THE UE REACHING A LIMIT ON THE OVERALL NUMBER OF LBT FAILURES OR RANDOM ACCESS FAILURES THAT THE UE IS PERMITTED TO EXPERIENCE IN THE REDIRECTION PROCEDURE WITH RESPECT TO THE TARGET CELLS, OR REACHING A LIMIT ON THE OVERALL TIME THE UE IS PERMITTED TO EXPEND FOR ATTEMPTING RANDOM ACCESS WITH RESPECT TO THE TARGET CELLS
1004

BEGIN

Base station receives
user data from UE
2002

Base station initiates
transmission of user
data to the host
computer
2004

Host computer receives
the user data
2006

END

VIRTUAL APPARATUS 2100

REDIRECTING UNIT 2102

FAILURE RECOVERY UNIT 2104

VIRTUAL APPARATUS 2200

DETERMINING UNIT 2202

CONFIGURING UNIT 2204

HANDLING REDIRECTION FAILURES IN RRC CONNECTION REDIRECTION PROCEDURE

TECHNICAL FIELD

The present invention generally relates to redirection procedures in wireless communication networks and handling redirection failures.

BACKGROUND

NR in Unlicensed Spectrum (NR-U)

Currently the 5th generation of cellular system, called New Radio (NR) is being standardized in 3GPP. NR is developed for maximum flexibility to support multiple and substantially different use cases. Besides the typical mobile broadband use case, NR supports machine type communication (MTC), ultra-low latency critical communications (URLCC), side-link device-to-device (D2D) and several other use cases too.

In NR, the basic scheduling unit is called a slot. A slot consists of 14 OFDM symbols for the normal cyclic prefix configuration. NR supports many different subcarrier spacing configurations and at a subcarrier spacing of 30 kHz the OFDM symbol duration is ~33 us. As an example, a slot with 14 symbols for the same subcarrier-spacing (SCS) is 500 us long (including cyclic prefixes).

NR also supports flexible bandwidth configurations for different UEs on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous PRBs. Reserved resources can be configured within the bandwidth part. The bandwidth of a bandwidth part equals to or is smaller than the maximal bandwidth capability supported by a UE.

NR targets both licensed and unlicensed bands and a work item named NR-based Access to Unlicensed Spectrum (NR-U) was started in January 2019. Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3GPP industry as a whole. It is expected that some features in NR will need to be adapted to comply with the special characteristics of the unlicensed band as well as also different regulations. A subcarrier spacing of 15 or 30 kHz are the most promising candidates for NR-U OFDM numerologies for frequencies below 6 GHz.

When operating in unlicensed spectrum many regions in the world require a device to sense the medium as free before transmitting, This, operation is often referred to as Listen-Before-Talk or "LBT" for short. There are many different flavors of LBT, depending on which radio technology the device uses and which type of data it wants to transmit at the moment. Common for all flavors of LBT, however, is that the sensing is done in a particular channel (corresponding to a defined carrier frequency) and over a predefined bandwidth. For example, in the 5 GHz band, the sensing is done on respective 20 MHz channels.

Many devices are capable of transmitting (and receiving) over a wide bandwidth, e.g., spanning multiple sub-bands/channels, e.g., LBT sub-band (i.e., the frequency part with bandwidth equals to LBT bandwidth). A device is only allowed to transmit on the sub-bands where the medium is sensed as free. Again, there are different flavors of how the sensing should be done when multiple sub-bands are involved.

In principle, there are two ways a device can operate over multiple sub-bands. One way is that the transmitter/receiver bandwidth is changed depending on which sub-bands were sensed as free. In this setup, there is only one component carrier (CC) and the multiple sub-bands are treated as single channel with a larger bandwidth. The other way is that the device operates almost independent processing chains for each channel. Depending on how independent the processing chains are, this option can be referred to as either carrier aggregation (CA) or dual connectivity (DC).

Channel Access Procedure in NR Unlicensed Spectrum

Listen-before-talk (LBT) is designed for unlicensed spectrum co-existence with other RATs. In this mechanism, a radio device applies a clear channel assessment (CCA) check (i.e. channel sensing) before any transmission. The check involves energy detection (ED) over a time period compared to a certain energy-detection threshold (ED threshold) in order to determine whether the channel is idle—this can be understood as performing energy detection at the frequency/frequencies corresponding to the channel. In case the channel is determined to be occupied, the transmitter performs a random back-off within a contention window before next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS differentiation, a channel access priority based on the service type has been defined. For example, there are four LBT priority classes defined for differentiation of contention window sizes (CWS) and MCOT between services.

Prior to any transmission in the uplink, the UE may need to perform the LBT operation to grasp the channel. For instance, the MAC layer initiates a transmission, the MAC layer requests the PHY layer to initiate the LBT operation, the PHY layer further sends an indicator to the MAC indicating the LBT outcome (i.e., success or failure).

Radio Link Monitoring in LTE and NR Licensed

One of the main intentions of the RLF procedure in LTE was to assist the UE to perform a fast and reliable recovery without going via RRC_IDLE. It is beneficial to avoid unnecessary latency due to the RACH access and RRC connection establishment from RRC_IDLE. The radio link monitoring in LTE is illustrated in FIG. 1.

In LTE, there are several reasons that may lead to the radio link failure. One reason is Timer T310 expiry. While the UE is in RRC connected mode, the UE monitors the downlink radio channel quality based on the downlink reference symbol. The UE compares the measured downlink channel quality with the out-of-sync and in-sync thresholds, Qout and Qin respectively. The physical channel evaluates the downlink channel quality, periodically sends indication on out-of-sync or in-sync, to layer 3. The UE layer 3 then evaluates the in-sync and out-of-sync indications that output from the layer 3 filter, for assessment of radio link failure. When the consecutively received out-of-sync indications are beyond the counter N310, a timer T310 is started. While T310 is running, the radio link considered to be recovered if the UE consecutively receives N311 in-sync indications from the physical layer.

When the timer T310 is expired, a radio link failure is declared by the UE.

Other defined reasons or bases for declaring radio link failure include reaching the maximum number of RLC transmissions. Yet another basis for declaring radio link failure is handover failure and timer T304 expiry.

During handover procedure, the timer T304 is started when the UE receives a handover command from the source cell, the value of the timer T304 should be set to allow the UE to try the maximum RACH access attempts to the target cell. When the timer T304 is expired, a radio link failure due to handover is detected.

When a radio link failure is triggered, the radio connection re-establishment is triggered. A UE shall first perform cell search to determine the best cell for radio link re-establishment. According to 3GPP TS 36.300 v15.7.0, a UE can select the same cell, a different cell from the same eNB, or a prepared cell from a different eNB, wherein the activity can be resumed (i.e., the UE stays in connected mode) via radio connection re-establishment procedure since the previous UE context can be retrieved by inter-cell communication. However, when a prepared cell is not available, the UE selects an unprepared cell. In this case, the UE has to go to idle mode and try to set up the radio connection afterwards. In this case, activity of the UE cannot be resumed.

FIG. 2 depicts Table 10.1.6-1 from 3GPP TS 36.300, which guides the UE behavior for target cell selection.

UL LBT Failure Handling—Detection of Consistent U L LBT Failures

During an RLM procedure, the RLM RSs may be subject to LBT failures. Therefore, a UE may miss one or several RS receptions, which affects triggering of RLF. For any uplink transmission, a UE may need to perform an LBT operation. The transmission would be dropped if the LBT operation fails. These failures can affect management of the counters of different MAC procedures, such as preamble counter or SR counter. If the preamble counter is not incremented, the UE may delay entering RLF procedure, which is certainly not desired. This would call for a separate counter which counts the amount of LBT failures for RA transmission, upon which the UE can trigger RLF if the counter reaches a maximum value. A mechanism similar to Beam Failure Detection (BFD) has been agreed for detection of UL LBT failures. This would reduce the work efforts for the 3GPP to design detection mechanism. The MAC entity may be configured by RRC with a consistent LBT failure recovery procedure. Consistent LBT failure is detected per UL BWP by counting LBT failure indications, for all UL transmissions, from the lower layers to the MAC entity. RAN2 has agreed to define a UE capability for consistent UL LBT failure detection and recovery. The feature will be optional for the UE.

RRC configures the following parameters in the lbt-FailureRecoveryConfig:

lbt-FailureInstanceMaxCount for the consistent LBT failure detection;

lbt-FailureDetectionTimer for the consistent LBT failure detection;

The following UE variables are used for the consistent LBT failure detection procedure:

LBT_COUNTER: counter for LBT failure indication which is initially set to 0.

For each activated Serving Cell configured with lbt-FailureRecoveryConfig, a simplified MAC procedure is described in an example. The detailed procedure would be different depending on whether consistent UL LBT failures are detected in the primary cell (PCell or PSCell) or in an SCell.

> 1> if LBT failure indication has been received from lower layers:
>> 2> start or restart the lbt-FailureDetectionTimer;
>> 2> increment LBT_COUNTER by 1;
>> 2> if LBT_COUNTER>=lbt-FailureInstanceMax-Count:
>>> 3> declare consistent LBT failures for the active UL BWP
> 1> if the lbt-FailureDetectionTimer expires; or
> 1> if lbt-FailureDetectionTimer or lbt-FailureInstanceMaxCount is reconfigured by upper layers:
>> 2> set LBT_COUNTER to 0.

A UE may be configured with several BWPs. UL LBT failure handling should be operated per BWP. The UE shall maintain a timer and a counter for the active BWP. Whenever the UE switches to a different BWP, the UE shall reset the timer and the counter in the new active BWP for detection of UL LBT failures. At the same time, the UE resets the timer and the counter in the de-activated BWP. If the active BWP comprises several LBT subbands, it is enough for the UE to keep a common counter across LBT subbands with the same BWP. In other words, an UL LBT problem is only declared in case the number of LBT failures from any LBT subbands has reached a predefined counter.

Recovery Actions Upon Detection of Consistent UL LBT Failures

If a UE experiences LBT problems in its current active BWP, it is beneficial for the UE to switch to another BWP prior to triggering of an RLF. The UE initiates a RA on an inactive BWP which has PRACH resources configured. Upon reception of the RA, the gNB can decide if the UE needs to switch to another BWP. The gNB can reply with a DCI or an RRC reconfiguration indicating the new BWP which may be different than the one used by the UE for making the RA. After switching to the new active BWP, the UE can reset the counter for LBT problem detection.

If the UE has detected LBT problems for all configured BWPs with RA configured, the UE may declare an RLF for the cell and trigger RRC connection reestablishment.

In case an RLF event is triggered, the UE would follow the existing RRC connection reestablishment procedure to recover from the failure.

For a UE configured with SCells, if the UE has detected consistent UL LBT failures in an SCell, the UE informs the gNB of the occurrence of the LBT failures, and the gNB takes appropriate recovery actions, for example, to order the UE to switch to another BWP in the SCell, or to inactivate or de-configure the cell where the UL LBT failures have been detected. A newly defined MAC CE provides a mechanism for the UE to report the detection of consistent uplink LBT failures in an SCell, to the network node where SCell is defined. The new MAC CE (named "UL LBT failure" MAC CE) can indicate the serving cell in which consistent UL LBT failures have been detected. The gNB knows in which BWP the UE is currently active and, as a UE only has one active BWP per cell, upon reception of the MAC CE, the gNB deduces that the UE has experienced consistent UL LBT failures in its current active BWP in the indicated cell. The MAC CE format carries a bitmap field to indicate all the cells in which the UE has declared consistent UL LBT failures.

When consistent UL LBT failures are detected in a BWP of an SCell, the MAC entity will trigger a UL LBT failure Indication MAC CE. If there is an available UL grant in any serving cell for a new transmission, the UE will indicate to its multiplexing-and-assembly entity to include an UL LBT failure MAC CE in the subsequent uplink transmission. If there is no UL grant available, the UE shall trigger a scheduling request (SR), requesting new UL resources for the MAC CE.

The MAC CE is also applicable to the primary cell (PCell or PSCell). In the primary cell, the UE switches to another BWP and initiates RACH upon declaration of consistent LBT failures. During the RACH procedure especially for a CBRA based procedure, the UE can include the MAC CE (e.g., UL LBT failure MAC CE) in Msg3 so that the gNB can identify the purpose why the RA has been triggered by the UE. When consistent uplink LBT failures are detected on the PSCell, the UE informs MN via the SCG failure information procedure after detecting consistent UL LBT failures in all configured BWPs.

An example of the recovery procedure is illustrated in the flow chart depicted in FIG. 3.

RRC Release

Load balancing is achieved in NR with handover, redirection mechanisms upon RRC release, and use of inter-frequency and inter-RAT absolute priorities and inter-frequency Qoffset parameters.

As specified in the RRC spec 38.331-f80 clause 5.3.8, the purpose of the RRC release procedure is to release the RRC connection, which includes the release of the established radio bearers as well as all radio resources, or to suspend the RRC connection only if SRB2 and at least one DRB are set up, which includes the suspension of the established radio bearers.

The network initiates the RRC connection release procedure to transit a UE from the RRC_CONNECTED mode to the RRC_IDLE mode, or to transit a UE in the RRC_CONNECTED mode to the RRC_INACTIVE mode only if SRB2 and at least one DRB is setup in RRC_CONNECTED, or to transit a UE in RRC_INACTIVE back to RRC_INACTIVE when the UE tries to resume, or to transit a UE in RRC_INACTIVE to RRC_IDLE when the UE tries to resume. The procedure can also be used to release and redirect a UE to another frequency.

Upon reception of the RRCRelease message,
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if the AS security is not activated:
    2> ignore any field included in RRCRelease message except waitTime;
    2> perform the actions upon going to RRC_IDLE as specified in 5.3.11 with the release cause 'other' upon which the procedure ends;
1> if the RRCRelease message includes redirectedCarrierInfo indicating redirection to eutra:
    2> if cnType is included:
        3> after the cell selection, indicate the available CN Type(s) and the received cnType to upper layers;
NOTE: Handling the case if the E-UTRA cell selected after the redirection does not support the core network type specified by the cnType, is up to UE implementation.

1> if the RRCRelease message includes the cellReselectionPriorities:
    2> store the cell reselection priority information provided by the cellReselectionPriorities;
    2> if the t320 is included:
        3> start timer T320, with the timer value set according to the value of t320;
1> else:
    2> apply the cell reselection priority information broadcast in the system information;
1> if deprioritisationReq is included:
    2> start or restart timer T325 with the timer value set to the deprioritisationTimer signalled;
    2> store the deprioritisationReq until T325 expiry;
1> if the RRCRelease includes suspendConfig:
    2> apply the received suspendConfig;
    2> reset MAC and release the default MAC Cell Group configuration, if any;
    2> re-establish RLC entities for SRB1;
    2> if the RRCRelease message with suspendConfig was received in response to an RRCResumeRequest or an RRCResumeRequest1:
        3> stop the timer T319 if running;
        3> in the stored UE Inactive AS context:
            4> replace the KgNB and KRRCint keys with the current KgNB and KRRCint keys;
            4> replace the C-RNTI with the temporary C-RNTI in the cell the UE has received the RRCRelease message;
            4> replace the cellIdentity with the cellIdentity of the cell the UE has received the RRCRelease message;
            4> replace the physical cell identity with the physical cell identity of the cell the UE has received the RRCRelease message;
    2> else:
        3> store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSlB;
    2> suspend all SRB(s) and DRB(s), except SRB0;
    2> indicate PDCP suspend to lower layers of all DRBs;
    2> if the t380 is included:
        3> start timer T380, with the timer value set to t380;
    2> if the RRCRelease message is including the waitTime:
        3> start timer T302 with the value set to the waitTime;
        3> inform upper layers that access barring is applicable for all access categories except categories '0' and '2';
    2> if T390 is running:
        3> stop timer T390 for all access categories;
        3> perform the actions as specified in 5.3.14.4;
    2> indicate the suspension of the RRC connection to upper layers;
    2> enter RRC_INACTIVE and perform cell selection as specified in TS 38.304 [20];
1> else
    2> perform the actions upon going to RRC_IDLE as specified in 5.3.11, with the release cause 'other'.

Upon expiry of T320, the UE shall:

1> if T320 expires:

2> if stored, discard the cell reselection priority information provided by the cellReselectionPriorities or inherited from another RAT;

2> apply the cell reselection priority information broadcast in the system information.

Upon receiving the expiry of DataInactivityTimer from lower layers while in RRC_CONNECTED, the UE shall:

1> perform the actions upon going to RRC_IDLE as specified in 5.3.11, with release cause 'RRC connection failure'.

SUMMARY

Methods and apparatuses involve a network node of a wireless communication network and a wireless device attempting redirection with respect to the network. An overall bound limits how many times or for how long the wireless device attempts redirection and provides a mechanism for the wireless device to extend its redirection efforts to one or more redirection targets beyond those indicated by the network.

An example embodiment is a method performed by a User Equipment (UE), where the terms "UE" and "wireless device" are interchangeable. The method includes the UE receiving a Radio Resource Control (RRC) release message indicating redirection of the UE, and the UE attempting the redirection towards one or more indicated redirection targets, as indicated in the release message. The attempting is subject to an overall limit that bounds the overall number of redirection attempts made by the UE towards the one or more redirection targets, or bounds the overall time allowed for the redirection attempts made by the UE towards the one or more indicated redirection targets. Upon reaching the overall limit, the UE attempts redirection towards one or more further redirection targets, wherein at least one of the further redirection targets is not among the one or more indicated redirection targets.

A related or corresponding example embodiment is a UE comprising communication interface circuitry configured for sending signals to and receiving signals from radio access nodes of a wireless communication network. The UE further comprises processing circuitry operatively associated with the communication interface circuitry and configured to receive an RRC release message indicating redirection of the UE. Correspondingly, the processing circuitry of the UE is configured to attempt the redirection towards one or more indicated redirection targets, as indicated in the release message, subject to an overall limit that bounds the overall number of redirection attempts made by the UE towards the one or more redirection targets, or bounds the overall time allowed for the redirection attempts made by the UE towards the one or more indicated redirection targets. The processing circuitry is further configured to, upon reaching the overall limit, attempt redirection towards one or more further redirection targets, wherein at least one of the further redirection targets is not among the one or more indicated redirection targets.

Another example embodiment is a method performed by a network node of a wireless communication network. The method includes sending configuration information to a UE, indicating one or more configuration parameter values for the UE to use for triggering a redirection failure recovery procedure while performing a redirection procedure. A related example embodiment is a network node configured for operation in a wireless communication network. The network node includes communication interface circuitry and processing circuitry. The processing circuitry is configured to send, via the communication interface circuitry, configuration information to a UE, indicating one or more configuration parameter values for the UE to use for triggering a redirection failure recovery procedure while performing a redirection procedure.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a table depicting example behavior of a UE for target cell selection.

FIGS. 7-10 are logic flow diagrams of example embodiments of a method of operation by a wireless device.

DETAILED DESCRIPTION

Figure 1:
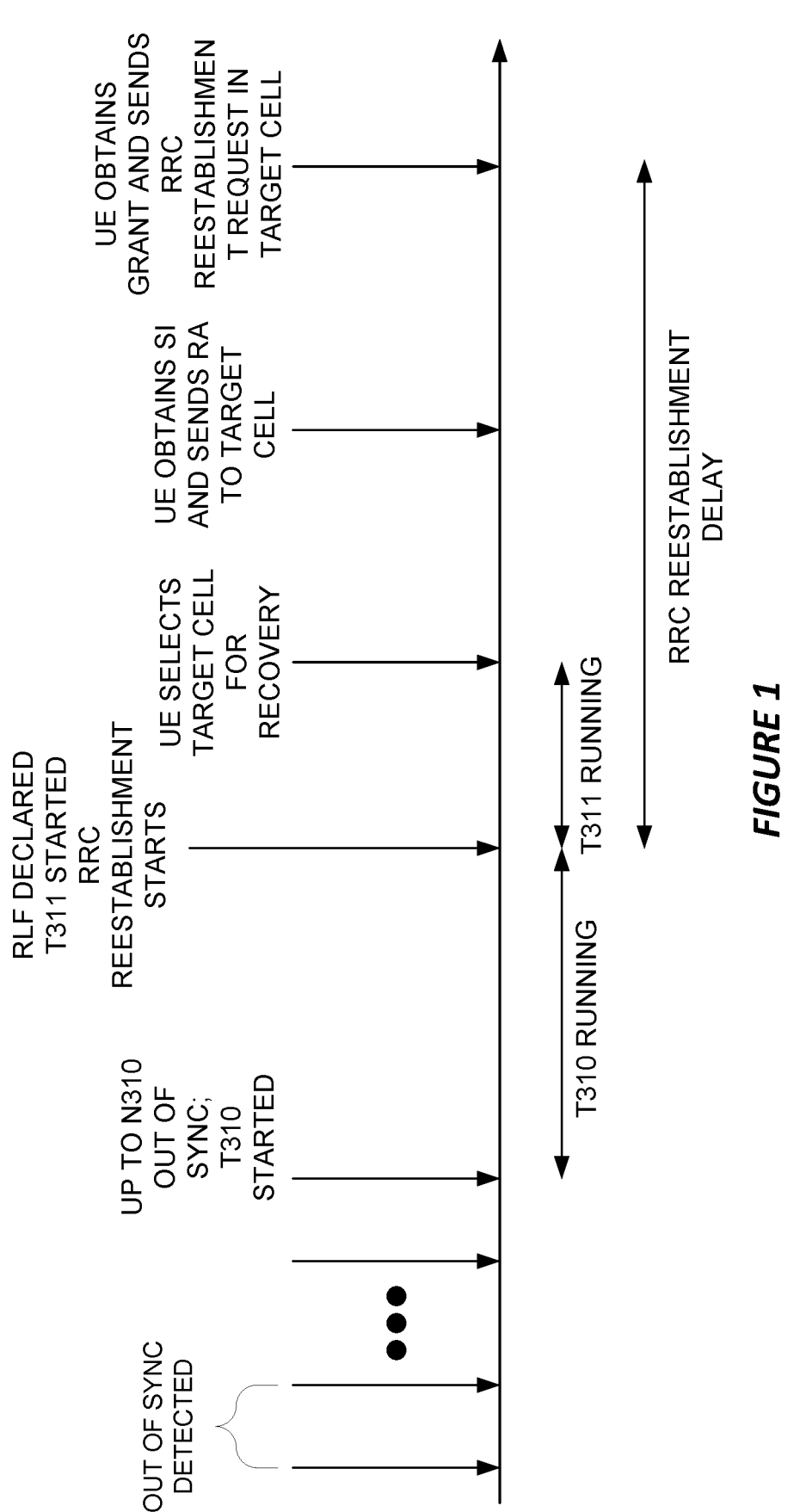
FIG. 1 is a diagram of an example of radio link monitoring of a serving cell followed by RRC re-establishment to a target cell.
Figure 3:
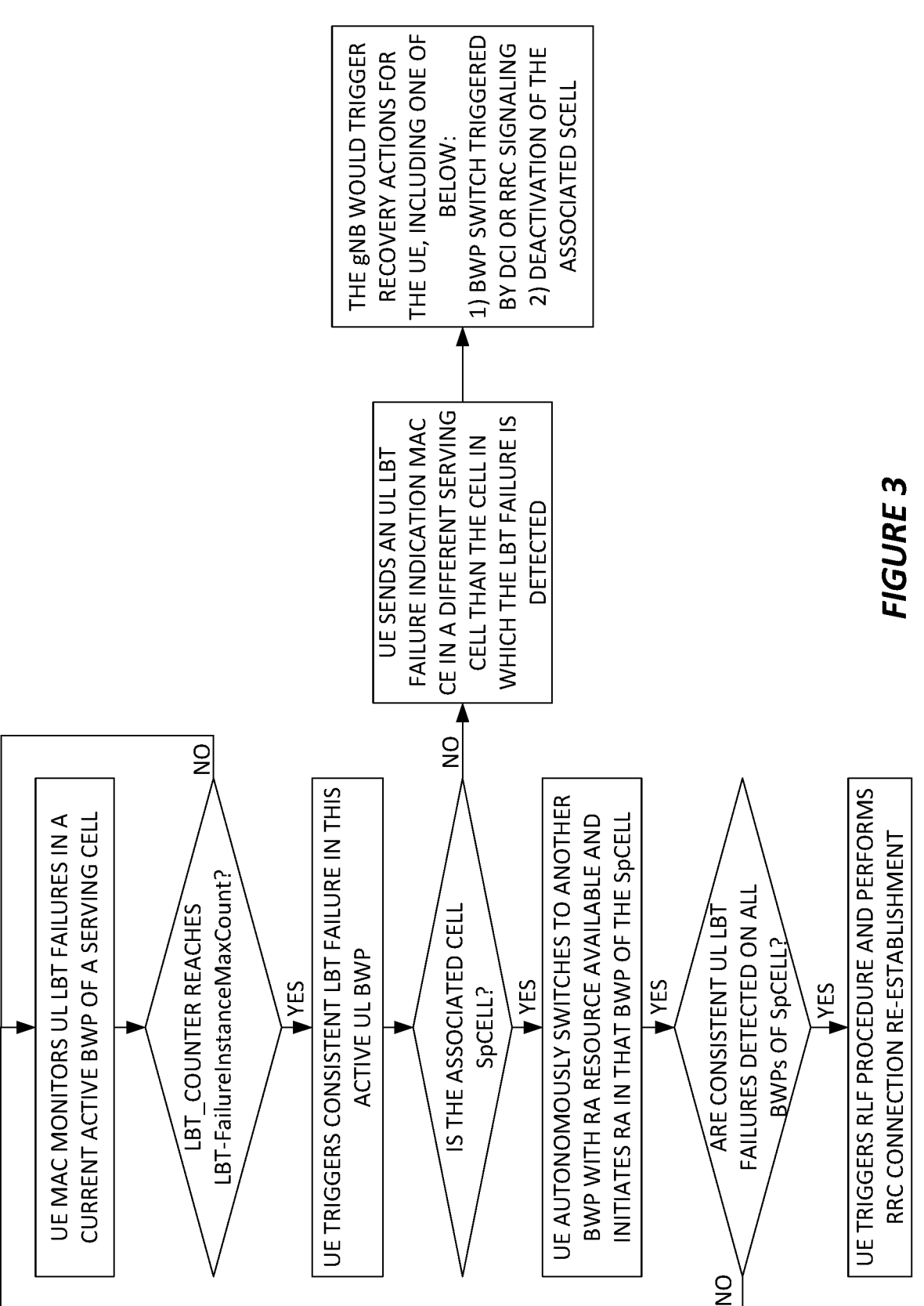
FIG. 3 is a logic flow diagram illustrating example handling of an uplink failure, for a UE in a connected mode.

The network initiates the RRC connection release procedure to transit a UE in RRC_CONNECTED to RRC_IDLE; or to transit a UE in RRC_CONNECTED to RRC_INACTIVE only if SRB2 and at least one DRB is setup in RRC_CONNECTED; or to transit a UE in RRC_INAC- TIVE back to RRC_INACTIVE when the UE tries to resume; or to transit a UE in RRC_INACTIVE to RRC_IDLE when the UE tries to resume. The procedure can also be used to release and redirect a UE to another frequency.

3GPP has defined a maximum latency requirement in case the RRC release carries a redirection indicator. The UE needs to perform access to the redirected carriers/cells within the maximum latency requirement. During this time period, the UE typically performs more active DL measurements faster (e.g. once every SMTC period) to find suitable cell to camp. If the UE cannot perform the access to the redirected carriers/cells successfully within the maximum time period, then the UE behavior is not defined unless the RRC release message carries a suspend indicator. If the RRC release carries a suspend indicator, the UE needs to go to RRC IDLE or RRC INACTIVE and perform ordinary, less-frequent DL measurements for cell selection or reselection.

If the redirected carrier/cells is/are on an unlicensed band, the DL signaling and UL transmission may be subject to LBT failures. Especially, the RACH transmission by the UE for a redirection target cell may be subject to LBT failures. If the UE experiences consistent LBT failures for RACH in a selected target cell, the UE cannot complete the RACH access to the cell within the maximum allowed time period.

One issue recognized herein is that the existing RRC redirection procedure leads to unacceptable service interruptions, in cases where the UE is unable to access the selected target cell before expiration of the maximum time period. In particular, consider a case where repeated random access attempts by the UE towards the selected target cell fail, as a consequence of LBT failures. According to existing procedures, a UE would continue attempting random access towards the target cell until expiration of the maximum time period, leading to an unacceptable service interruption to the UE.

As described earlier herein, NR Rel-16 introduced an UL LBT failure handling mechanism, but the mechanism applies only to a UE in the RRC connected mode. The related configuration is signaled to the UE by a serving gNB via dedicated RRC signaling, such as RRC reconfiguration, RRC resume, or RRC setup. No valid procedure for LBT failure handling exists in the context of the context of an RRC redirection procedure; there is no valid LBT failure handling configuration for the target cell. Consequently, as recognized herein, it is not feasible for the UE to apply the existing LBT failure handling mechanism for the RRC redirection procedure.

Among other things, the techniques disclosed herein address a problem scenario in which a UE experiences consistent LBT failures during an RRC redirection procedure. An example method includes (a) the UE performing LBT detection and recovery during the RRC redirection procedure, (b) the UE performing random access on one of the cells or its part of a redirected carrier, (c) the UE applying a first time-out or counting mechanism to limit the number of random-access attempts it makes with respect to a particular cell, and (d) the UE applying a second time-out or counting mechanism to limit the number of further carriers/cells it tries for RRC redirection, before declaring an RRC redirection failure.

For example, the UE receives an RRCRelease message that lists cells/frequencies for redirection. The UE tries individual cells in the list, subject to a first timeout mechanism, e.g., to limit the number of LBT procedures/random-access attempts the UE performs towards the target cell, before the UE selects another cell. The second timeout mechanism overarches the first timeout mechanism and limits the number of cells/frequencies in the list that the UE targets for redirection, before selecting another suitable cell/frequency that is not necessarily in the list, as a redirection target.

As a more detailed example of one method of UE operation contemplated herein, a UE is configured to perform LBT failure detection and recovery during an RRC redirection procedure on one or more target cells of a redirected carrier indicated in the RRC release message. In one example, at least one parameter in the related configuration is signaled to the UE by the gNB via RRC signaling such as RRC release, or a MAC CE or a DCI. In another example, at least one parameter in the related configuration is determined by the UE based on a pre-defined rule, e.g., using the same value as or a function of what is configured for the serving cell. The related configuration may comprise any one or more of the following:

A. A list of cells within a redirected carrier or a list of cells within a list of redirected carriers, or a list of redirected carriers, wherein the cells and the carriers are listed in a specific order (e.g., a decreasing access priority order).

B. Configuration of a part of the cell (in one example, the configuration of a part of a cell may be comprised in UL resource configuration for UL transmission attempts, e.g., RA resources). The UL resource configuration may be provided proactively or upon detecting the failure in the UE. A part of a cell may comprise one or more of: a set of time resources, a set of frequency resources, a space (area) within the cell, a beam/direction, etc.

C. Both 2-step and 4-step random access resources can be configured on a BWP or cell. In this case the UE can be configured to select either 2-step or 4-step RA_TYPE according to normal procedures based on RSRP_THRESHOLD_RA_TYPE_SELECTION, or it can be configured to always start with the 2-step procedure to minimize the impact of LBT. The UE may be configured to fall back to the other RA_TYPE after a maximum number of RA attempts, Another option is to configure contention free random access resources (CFRA) on a BWP. In this case the UE could be allowed to fallback to 2-step CBRA even if 4-step CFRA is configured to minimize the impact of LBT.

D. A list of parts of one or more cells to be used for attempting to access each such cell, which can be in a specific order based on the priorities.

E. A first counter value indicating the maximum number of RACH transmission attempts, or the maximum number of LBT failures that can be experienced by the UE during the random access procedure, while attempting to access a target cell or a part of a target cell.

F. A second counter value indicating the maximum number of RACH transmission attempts, or the maximum number of LBT failures that can be experienced by the UE during the random access procedure, after reception of the concerned RRC release message and before stopping further random access attempts towards any of the cell(s)/frequency(ies) listed in the concerned RRC Release message, i.e. before i.e. declaring an RRC redirection failure.

G. A first timer value indicating the maximum amount of time the UE can try to perform random access to one the cells or its part of a redirected carrier.

H. A second timer value indicating the maximum amount of time the UE can try to perform random access after reception of the concerned RRC release message and before declaring RRC redirection failure.

In one or more embodiments, the contemplated method of UE operation further includes the UE performing random access on one of the cells or a cell-part of a redirected carrier, and carrying out the following operations.

(1) Stepping a counter that is stepped for each RACH attempt, or for each LBT failure occurrence during random access, e.g., whenever an LBT failure occurs while attempting to transmit RA msg1/msgA/msg3. A first counter may be (re)started whenever the UE selects to access a new cell, and a second counter is started when the UE selects to access the first cell attempted.

(2) Starting a timer, wherein a first timer may be (re) started whenever the UE selects to access a new cell, and wherein a second timer is started when the UE selects to access the first cell.

The contemplated example method of UE operation further includes the UE acting upon reaching the first value counter or the first value timer while attempting to access a cell (e.g. cell1) of one or more redirected carriers (e.g. F1). Reaching either the counter or timer limit in this manner implies any of the following:

(1) The UE is triggered to select another cell (e.g. cell2) that is different than the cell (e.g. cell1) on which the first timer/counter limit was reached. In one example, cell2 belongs to the same carrier (e.g. F1) as cell1. In another example, cell2 belongs to carrier (e.g. F2) different than that of cell1. The UE may determine the carrier of cell2 (e.g. F1 or F2) based on a rule, which can be pre-defined or configured by the network node e.g. in the RRC release message. For example, cell2 or F2 in the example above can be the second highest priority cell or the second highest priority carrier in the list of cells/carriers provided in the RRCRelease message.

(2) The UE barring or down-prioritizing the cell, e.g. cell1, or the carrier, e.g. F1, where it experienced the first timer/counter limit from channel access for a certain amount of time. The UE may decide to bar or down-prioritize the frequency, e.g. F1, if it can derive from the access problems in the current cell that other cells on the same carrier will result in the same access problems.

The contemplated example method of UE operation further includes, upon reaching the second value counter or the second value timer while attempting to access one of the cells of a redirected carrier, the UE performing any of the following operations:

(1) The UE barring all the cells and all the carriers for which the UE has tried random access after reception of the concerned RRC release message and before stopping performing random access in the cell(s)/frequency (ies) listed in the RRCRelease message, i.e. before declaring RRC redirection failure.

(2) The UE stopping its performance of random access in the cell(s)/frequency(ies) listed in the concerned RRC release message, i.e., declaring RRC redirection failure, and selecting any other suitable cell in any suitable carrier not necessarily belonging to the list of cells/ carriers indicated in the RRCRelease message.

Among the several advantages provided by the techniques disclosed herein is a well-defined UE behavior in the context of unsuccessful channel access, e.g., due to LBT failures, when doing RRC release with redirection to a redirected carrier. Reduced power consumption by the UE stands as another advantage. Still further, the disclosed techniques provide for good load balancing (e.g. distribution of UEs) on different cells of the involved network, especially under conditions of high LBT failures and load. Of course, the disclosed techniques are not limited to these features and advantages. Those of ordinary skill in the art will recognize additional features and advantages from the descriptions and figures included herein.

For example, the disclosed techniques and attendant operations apply both to licensed and unlicensed operations (such as LAA/eLAA/feLAA/MuLteFire, and NR unlicensed operation (NR-U)).

The phrases "an event of LBT failure" and "LBT failure event" refer to consistent LBT failure occurrences, such as a defined number of consecutive LBT failures. With "LBT" referring to the procedure of checking whether a channel is available for use, an "LBT failure occurrence" refers to the negative outcome—i.e., the LBT operations indicate that the channel is busy or not available. Thus, in an example case, and with respect to particular resources, a UE deems an LBT failure event to have occurred upon detecting a defined number of LBT failure occurrences, or upon reaching some time limit without LBT being successful. As an example, an LBT failure event means experiencing a defined number of consecutive LBT failures on a selected cell/carrier.

The terms "LBT" and "clear channel assessment" (CCA) are interchangeable, and other terms equivalent to "LBT procedure" include "shared spectrum access procedure." The carrier on which LBT is applied may belong to a shared spectrum or an unlicensed band or a band with contention-based access, etc. If at least one LBT failure event is declared, the UE may need to take recovery actions. With this flexibility in terminology in mind, the techniques disclosed herein are not restricted by the specific terms used when describing the various monitoring and failure-recovery operations.

Consider example implementation details for a "counter-related" embodiment of the contemplated techniques. A UE is configured with LBT failure detection and recovery during RRC connection release with redirection procedure. The configuration of the UE includes at least one of the following:

(1) A counter for counting transmission attempts or consecutive LBT failure occurrences, e.g., a counter indicating the number of LBT failures that constitute an "LBT failure event."

(2) One or several timers for detection of LBT failures.

(3) A maximum time period during which LBT attempts are allowed.

(4) Configuration of one or more parts of one or more cells (in one example, the configuration of a part of a cell may be comprised in UL resource configuration for UL transmission attempts, e.g., RA resources). The UL resource configuration may be provided proactively or upon detecting the failure in the UE.

(5) A list of the parts of a cell to attempt.

(6) A list of the cells to attempt, in a specific order.

(7) A list of carriers to attempt, in a specific order.

(8) An indication of autonomous selection by UE.

In an example implementation, the configuration configures the UE to "declare" an LBT failure event upon reaching some maximum number of LBT failures or upon reaching some maximum time limit for performing LBT procedures. An "LBT failure" or an "unsuccessful LBT" means or implies the performance of an LBT procedure that detects the involved radio resources—e.g., the involved "channel"—as being busy or unavailable. Correspondingly, an "LBT attempt" means or implies the performance of an LBT procedure, for determination of whether the involved radio resources are available.

Thus, with respect to a given channel, cell, frequency, or other particular radio resources, the UE may be configured to perform no more than a defined number of LBT attempts before declaring and LBT failure event, or may be configured to carry out LBT attempts until reaching a time limit. As a broad example, when a defined "maximum" is reached (e.g., when the number of attempts or LBT failures has reached a configured maximum number or the time period exceeds a defined threshold), the UE declares an LBT failure event.

Declaring the LBT failure event triggers the UE to perform a recovery action. For example, while trying to access a target cell using a "part" of the cell, the UE may also try to transmit in different parts of the cells. A "part" of a cell comprises, for example, one or more of: a set of time resources, a set of frequency resources, a space (area) within the cell, a beam/direction, etc.

In another example definition of the "LBT failure event," the UE performs LBT with respect to different parts of a cell, with the attempts being governed by some limit on the total number of attempts, or some limit on the time allowed for attempting. The limits may be expressed on per-cell-part basis, e.g., the UE makes some maximum number of LBT attempts with respect to each part of the cell tried by the UE, or limits the LBT attempts on each part of the cell according to some maximum timer. Upon failing on all the attempted parts of the cell, the UE declares the LBT failure event and, correspondingly, triggers a recovery action.

As an example, a "relevant part" of a cell is any configured part of the cell or a part selected by the UE part (e.g., autonomously or based on a pre-defined rule or based on a selection rule or sequence from a network node). The set of relevant parts of a cell may comprise all configured parts of the cell or a subset of the parts of the cell. The maximum number of the relevant parts to be attempted by the UE can be pre-defined or configured by the network or can even be autonomous or based on a pre-defined rule decided by the UE.

As far as monitoring for LBT failure occurrences, the UE monitors at least one of the below LBT failure occurrences: (1) LBT failures for any uplink transmission, (2) LBT failures for any downlink transmission, (3) the time elapsed since the first UL transmission attempt, and (4) the time elapsed since the first DL reception attempt.

In an example implementation, a first type of counter supervises the LBT failures occurring in one cell listed in an RRCRelease message and is reset whenever the UE tries to access a new cell in the list. The same logic may be applied for cell parts, e.g., for supervising LBT failures occurring in a certain part of a cell. Another type of counter supervises all the LBT failures occurring throughout all the random access procedures the UE initiates after reception of the concerned RRC release message.

Consider an example embodiment of a method of operation by a UE. The UE receives an RRCRelease message that lists cells or frequencies that are redirection targets. The UE selects a target cell for attempting LBT-based random access. Upon experiencing an LBT failure event for the target cell, the UE selects another cell for attempting random-access. The UE may select additional listed cells for attempting access, subject to an overall time limit or an overall count limit on the number of access attempts. Notably, an LBT failure event may be declared for a targeted cell, based on one unsuccessful series or set of attempts, or based on experiencing an unsuccessful series or set of attempts, in each of two or more parts of the target cell.

Related to the counter handling, the timers for detection of LBT failures may comprise several timers for different purposes. In one example, a timer is introduced for monitoring the interval of two consecutive LBT failure instances. The timer is started and restarted whenever a failure instance is detected. When the timer is expired, the counter of LBT failures can be reset to zero. In another example, a timer is introduced to reflect the maximum time period for the UE to declare an event of LBT failure. The timer is started/restarted when the UE detects the first LBT failure instance during a period when consistent LBT failure instances are being detected. When the timer is expired, the UE can declare an event of LBT failure. The timer can be stopped in case the UE cannot detect consecutive LBT failure instances. All timers and counters may be stopped/reset in case the UE has recovered from the declared LBT failure event or the UE has received reconfiguration signaling for LBT failure detection and recovery.

The configuration of LBT failure detection and recovery can be signaled to the UE by the gNB in a RRC signaling message such as RRC release message, or selected by the UE implementation or it can be determined by the UE based on a pre-defined rule. Therefore, the configuration may be applicable to any target cell during the subsequent cell section and reselection procedure. Alternatively, the configuration can be signaled to the UE via a MAC CE or DCI. Alternatively, the configuration can be signaled to the UE in the system information. For any above signaling means, they can be applied in a combined fashion. Alternatively, the UE can determine at least one parameter in the configuration based on a pre-defined rule, e.g., using the same parameter configuration used for the serving cell, for LBT failure detection and recovery.

Upon declaration of at least one LBT failure event, the UE can take at least one of the below recovery actions.

(1) The UE stops trying to access the currently selected target cell on the redirected carrier (e.g., indicated by redirectedCarrierInfo in RRC release).

(2) The UE selects another target cell to perform access. This cell may be on the same frequency as the previous cell in which a failure event has been declared. If there are multiple target cell candidates available, the UE may follow a decreasing priority order to select cell.

(3) If the number (Nc) of cells on the same frequency (e.g., redirected carrier which is indicated by redirectedCarrierInfo in RRC release) in which the UE has declared LBT failure event has reached a configured number (alternatively, a timer is introduced to limit the UE to select the cells on the same frequency), the carrier frequency can be barred for the UE for a configured time period. As special case Nc=1. If a frequency is barred, the UE can switch to another carrier frequency to find suitable cell to access. Alternatively, the carrier frequency is not barred; instead, it is down-prioritized for a configured time period. The UE may follow a decreasing priority order of the carrier to select cell. In one example the indicated redirection carrier shall be of the highest priority among all possible carrier frequencies. In another example the UE may autonomously select the carrier for redirection among all possible carrier frequencies configured for redirection. In yet another example the UE may be configured with one at least preferred carrier (e.g. F1) to which the UE may be required to do redirection and one or more additional carriers (e.g. F2, F3, . . . ) which is/are selected by the UE if the redirection to the preferred carrier fails due to the occurrence of the LBT failure event. For example, the UE is allowed to keep (re)selecting one or more cells in the one or more carriers listed in the RRC Release message as long as the second-type counter is running. Here, the "second-type counter" is the mechanism that limits the overall redirection attempts made by the UE. As an example, a "redirection attempt" is the UE attempting to access a redirection target, where a "redirection target" is a target cell or part of a target cell, with the targets determined from the release information—e.g., list of redirection carrier frequencies/cells. A redirection attempt includes the UE performing an LBT procedure and then attempting random access in dependence on the LBT being successful. Thus, a redirection attempt may fail as a consequence of the LBT procedure indicating that the channel is unavailable—an uplink LBT failure—or because the random access procedure fails.

(4) The UE can select a target cell in another RAT and/or of another duplex mode, when the intra-RAT attempts have not become successful. For this, the UE needs a configuration for the other RAT. That configuration may be the same or similar to the intra-RAT configuration, although one or more of the parameter values may differ.

Upon reaching a maximum bound on the number of LBT failures during redirection attempts or the time allowed for redirection attempts, the UE may perform any of the following actions.

(1) Barring or down-prioritizing all the cells and frequencies for which the UE has attempted random access after reception of the concerned RRC release message, for a certain amount of time.

(2) The UE stopping performing random access in the cell(s)/frequency(ies) listed in the RRC release message, i.e. declaring RRC redirection failure.

(3) The UE electing any other suitable cells on any suitable frequencies different from the cells and frequencies selected after reception of the concerned RRC release message.

In the context of carrying out LBT failure detection and the involved recovery procedure, as soon as the UE succeeds in accessing a target cell (i.e., when the UE has entered the RRC_Connected mode), the UE stops the LBT failure detection and recovery procedure and all relevant timers and counters are reset.

The UE may report information to the gNB, including any one or more of the following items.

(1) The failure reason (e.g., failure reason of the procedure due to consistent LBT failures).

(2) The carrier and the cells or cell parts in which the UE has declared events of LBT failures.

(3) The latency or time that it took for the UE to enter the RRC Connected mode since receipt of the RRC release message.

In at least one embodiment, a timer is introduced for improving the performance of RRC redirection by a UE. The timer is started when the UE receives an RRC release message containing redirection information, or when a first random access procedure after reception of the concerned RRC release message is initiated.

The timer is stopped, for example, upon the UE successfully entering the RRC_CONNECTED mode, or upon cell selection/re-selection, or upon reception of another RRC release with redirection information. As a further example, the timer is stopped responsive to the UE successfully transmitting a certain message to the target cell of the redirection carrier, e.g., the UE sends a random access (RA). Timer stoppage may be tied to a certain message of the RA procedure, such as, e.g. message 1, 2, 3 or 4 in 4-step RACH or message A or B in 2-step RACH.

More than one timer may be used, such as where a first type of timer (a first timer) supervises random access within one cell and is reset whenever the UE tries to access a new cell in one of the frequencies listed in the RRC Release message. Further, a second type of timer (a second timer) supervises all random access procedures the UE initiates after reception of the concerned RRC release message, until the UE gets into RRC_CONNECTED mode.

In a case where its access attempts towards a currently selected target cell are not successful within the period defined by the first timer, the UE may take at least one of the below actions.

(1) The UE stops trying to access the currently selected target cell.

(2) The UE selects another target cell for access. This new cell may be on the same frequency as the currently selected target cell. If multiple target cell candidates are available, the UE may follow a decreasing priority order to select the new target cell.

(3) The UE bars or down-prioritizes the currently selected cell.

As an alternative to using expiration of the first timer as a trigger for the UE to select a new target cell for attempting access, the UE may use a counter, e.g., a counter and an associated counter limit on the maximum number of RACH access attempts that can be attempted towards the currently selected target cell.

The UE can also attempt access on another part of the cell, which may be controlled by the first timer associated with the cell or a separate per-part timer can be introduced or the first timer is applied for each cell part, and after all relevant parts are attempted without success the UE can select another target cell to perform access.

The second timer limits the overall time period for the UE to attempt random access after reception of the concerned RRCRelease message. The UE is allowed to attempt random access in any one or more target cell among the cells listed in the RRC release message. However, expiration of the second timer triggers the UE to stop attempting random access with respect to the listed cells/frequencies.

A third new timer may be introduced to limit the overall time period for the UE to attempt random access of a certain RA_TYPE (2-step/4-step) after reception of the concerned RRCRelease message. The UE is allowed to attempt random access in any target cell among the cells listed in the RRC release message. Responsive to expiration of the third timer, the UE stops attempting random access using the selected RA_TYPE and tries the other RA_TYPE.

Consider an example case where the UE receives an RRC release message that includes redirection information indicating a redirection carrier frequency. The UE uses the first timer to control how long it attempts random access towards any one of the target cells associated with the redirection carrier frequency, either by timing its overall attempts for the cell according to a first timer, or by applying the first timer to the attempts directed to each of two or more different parts of the cell. Upon timing out with respect to a currently selected target cell—failing to access the cell within the specified time limit—the UE may "bar" further access attempts towards the cell, at least temporarily, or may lower a priority of the cell.

Upon timing out with respect to the carrier frequency, the UE may bar further access attempts on the carrier frequency, at least temporarily, or may down-prioritize the carrier frequency. Here, timing out with respect to the carrier frequency means expiration of an overall timer used that is to limit the amount of time allowed for the UE to attempt access on a particular carrier frequency. The time period(s) for how long a cell or a carrier frequency is down-prioritized may be defined by a configuration value.

Thus, in at least one embodiment, after expiration of the timer that was started upon reception of an RRC release with redirection information, the redirected carrier frequency and cells (e.g., indicated by redirectedCarrierInfo in RRC release) or the carrier frequency and cells for which random access was attempted after reception of the concerned RRC Release message, can be barred for the UE for a configured time period. If a frequency is barred, the UE can switch to another carrier frequency to find suitable cell to access. Alternatively, the carrier frequency is not barred; instead, it is down-prioritized for a configured time period.

The UE may follow a decreasing priority order to select cell. In one example the indicated redirection carrier shall be of the highest priority among all possible carrier frequencies. In another example the UE autonomously selects the carrier for redirection among all possible carrier frequencies configured for redirection. In yet another example the UE may be configured with at least one preferred carrier (e.g., frequency F1) to which the UE may be required to do redirection and one or more additional carriers (e.g., frequencies F2, F3, . . . ) which is selected by the UE if the redirection to the preferred carrier fails due to the occurrence of the LBT failure event. For example, the UE is allowed to keep (re)selecting one or more cells in the one or more carriers listed in the RRC Release message as long as the second type timer is running. The carrier selections and the selection order may also be based on a pre-defined rule and/or apply only to carriers with specific characteristics.

When the second type timer expires (or the first timer if there is only one timer introduced), the UE goes to RRC IDLE or RRC INACTIVE and performs ordinary cell selection and reselection procedure for further actions. Meanwhile the UE may declare an "RRC redirection failure" and report the failure to the gNB, upon the UE entering the RRC_Connected mode. In addition, the UE may also report one or more of the below items of information to the gNB.

(1) The failure reason (e.g., failure reason of the procedure due to consistent LBT failures.

(2) The carrier and the cells in which the UE has failed to access.

(3) The latency that the UE has taken to enter RRC Connected since the UE received the RRC release message.

In one or more embodiments, whether or not a UE supports or performs LBT failure detection and recovery during an RRC redirection procedure can be configured on a per UE basis. Or the behavior can be configured on a per frequency band basis. For example, the UE may support LBT failure detection and recovery for band n46 (e.g. 5 GHz) but not for band n1, etc. A UE capability may be introduced accordingly, so that a UE can indicate its capability to a network node, upon a request or in an unsolicited way. The network will take the capability information into account, such as by configuring a UE for performing the RRC connection redirection procedure contemplated herein, in dependence on the UE indicating that it has such capability.

Figure 4:
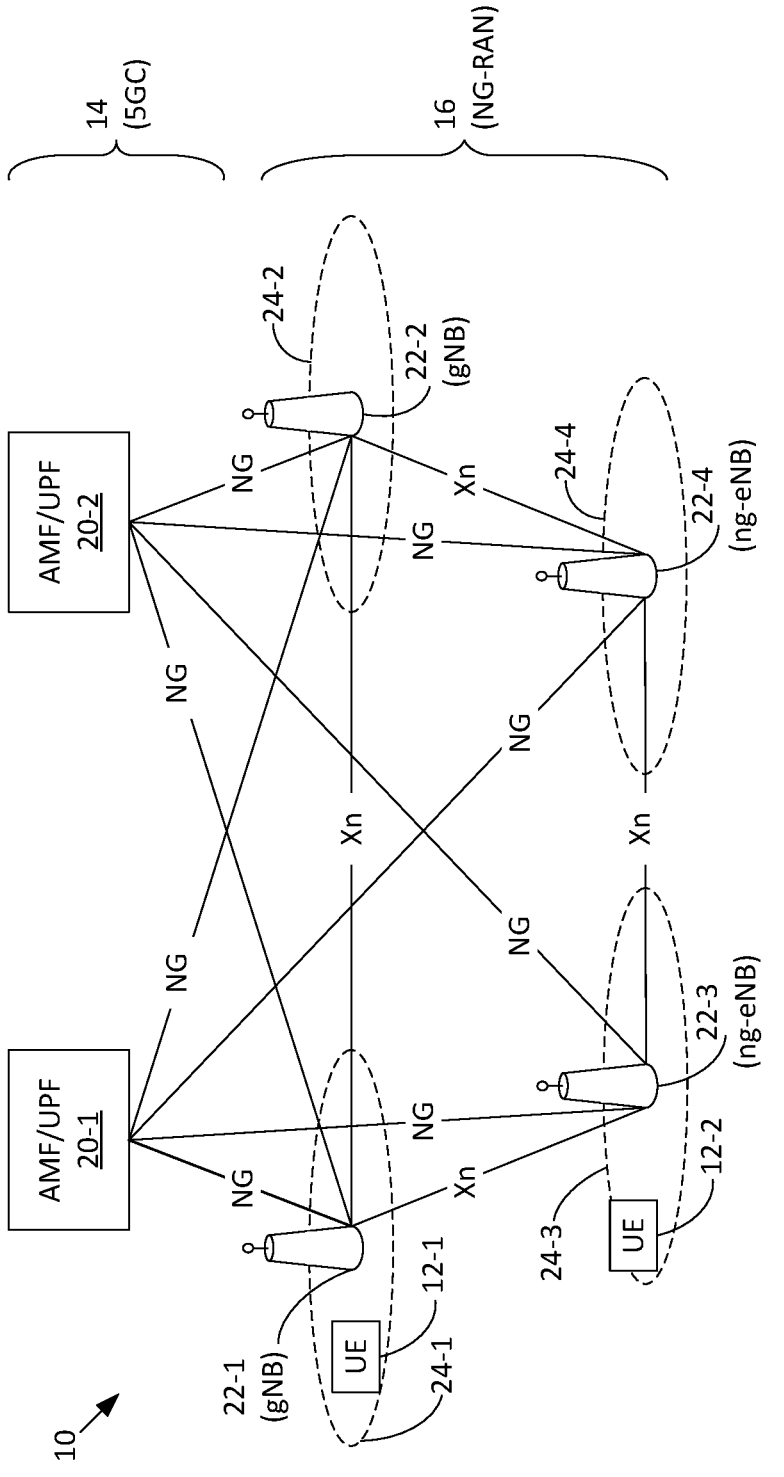
FIG. 4 is a block diagram of one embodiment of a wireless communication network.

FIG. 4 depicts an example embodiment of a wireless communication network 10 that is operative to provide one or more types of communication services to respective wireless devices 12. FIG. 4 depicts only two wireless devices 12 for convenience, shown as a UE 12-1 and a UE 12-2. The wireless communication network 10—the network 10—includes a core network (CN) part 14 and a radio access network (RAN) part 16. For example purposes, the CN 14 comprises a Fifth Generation CN (5GC), and the RAN 16 comprises a 5G RAN (Next Generation or NG RAN).

As a non-limiting example, the RAN 16 includes a plurality of radio access nodes 22 that may be of the same or different types. Here, four radio access nodes 22-1, 22-2, 22-3, and 22-4 are shown for discussion purposes. The radio access nodes 22-1 and 22-2 are 5G radio access points referred to as gNBs and provide New Radio (NR) air interfaces, while the radio access nodes 22-3 and 22-4 are 4G radio access points with backhaul connectivity to the 5GC 14 and are referred to as ng-eNBs.

The depicted arrangement is not a limiting example and instead provides a basis for understanding behavior of one or more network nodes of the network 10 and a wireless device 12 with respect to configuring and performing redirection procedures and configuring and performing redirection failure recovery procedures. For example, one or more of the radio access nodes 22 are configured according to network-side operations disclosed herein, and one or more of the wireless devices 12 are configured according to the device-side (UE-side) operations disclosed herein.

In the depicted example, each radio access node 22 provides a corresponding cell 24, i.e., the radio access node 22-1 provides a cell 24-1, the radio access point 22-2 provides a cell 24-2, the radio access node 22-3 provides a cell 24-3, and the radio access node 22-4 provides a cell 24-4. However, a single radio access node 22 may provide two or more cells 24 having full or partial overlap, e.g., by using different radio carrier frequencies. Broadly, the depicted cells 24 may all use the same frequency or there may be different frequencies involved. Similarly, one or more than one RAT may be involved. (There may be further radio network nodes of different types in the network 10.) Further, the cells 24 may involve beamforming and may be directionally shaped or defined by one or more radio beams, such that overlapping cell coverage means overlapping radio beam coverage.

A given cell 24 neighbors another cell 24 if the two cells 24 abut or overlap. As a general proposition, the cell boundaries correspond to minimum-required coverage levels (signal levels) and neighboring cells share one or more overlapping regions in which a wireless device 12 can be served by either cell 24 or, if supported, in a multi-cell configuration involving both of the neighboring cells 24.

Figures 5, 6:
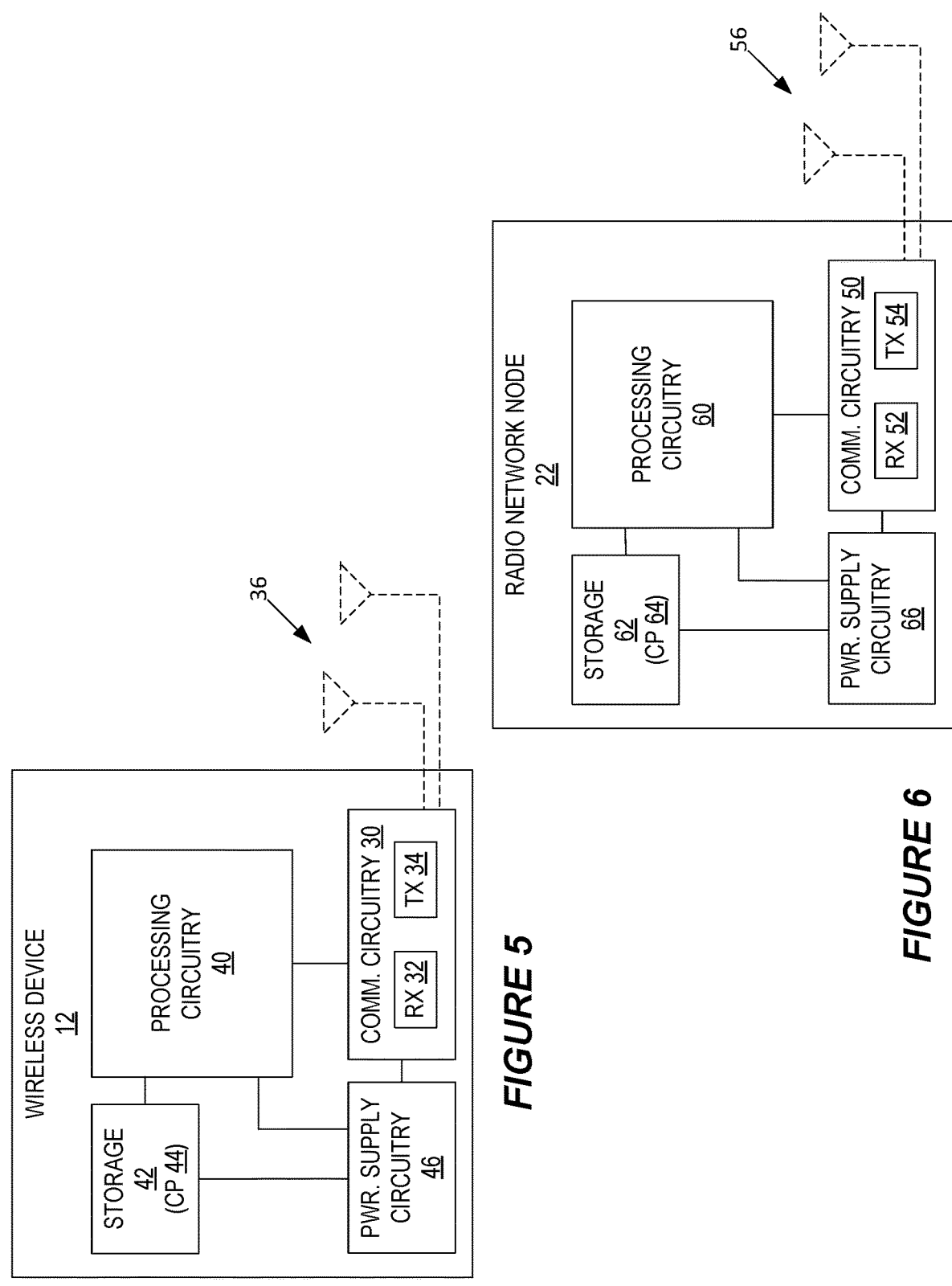
FIG. 5 is a block diagram of one embodiment of a wireless device.
FIG. 6 is a block diagram of one embodiment of a network node.

FIG. 5 illustrates an example embodiment of a wireless device 12, where the term "wireless device" is interchangeable with the term "UE."

The wireless device in an example implementation includes communication interface circuitry 30, including one or more kinds of transmitter circuitry 34 and receiver circuitry 32, e.g., cellular-radio circuitry, Wi-Fi circuitry, BLUETOOTH circuitry, etc. In short, while the communication interface circuitry 30 is subject to variation, it includes circuitry for sending and receiving signals via a physical medium and in the illustrated example is configured for radio communications over one or more air interfaces provided by one or more types of Radio Access Networks (RANs).

Other elements of the example wireless device include processing circuitry 40 comprising fixed circuitry or pro- grammatically-configured circuitry, or a mix of fixed cir- cuitry and programmatically configured circuitry. In at least one embodiment, the processing circuitry 40 comprises one or more microprocessors, microcontrollers, Digital Signal Processors (DSPs), Field Programmable Gate Arrays (FP- GAs), Application Specific Integrated Circuits (ASICs), or other digital processing circuitry that is/are specially adapted to carry out the operations described herein for a UE, based on the execution of computer program instructions.

Correspondingly, the processing circuitry 40 includes or is associated with storage 42, e.g., for storing the computer program instructions as one or more computer programs 44 and storing one or more items of configuration data. The storage 42 comprises one or more types of computer- readable media, such as working memory for "live" opera- tion of the wireless device 12 and program or long-term memory or other storage, for longer-term retention of the computer program(s) 44 and configuration data. Examples include any one or more of SRAM, DRAM, FLASH, Solid State Disk (SSD), EEPROM, and magnetic storage media.

The wireless device 12 in one or more embodiments further includes power supply circuitry 46, where the power supply circuitry 46 is configured to supply power to the wireless device 12. In an example implementation, the power supply circuitry 46 includes one or more regulation circuits configured to provide operating power to one or more elements or subsystems of the wireless device 12, based on input power from a battery or other source.

The processing circuitry 40 is operatively associated with the communication interface circuitry 30. "Operatively asso- ciated" means, among other things, that the processing circuitry 40 uses the communication interface circuitry 30 to exchange information with one or more external processing entities, e.g., in other nodes or functions, such as a radio network node 16 within the network 10. As such, the communication interface circuitry 30 may include or be associated with one or more antennas 36.

Further, the processing circuitry 40 is configured to carry out the device-side (UE-side) operations described herein for carrying out a redirection procedure and a redirection failure recovery procedure.

As one example, a UE 12 comprises communication interface circuitry 30 configured for sending signals to and receiving signals from radio access nodes 22 of a wireless communication network 10 and processing circuitry 40 operatively associated with the communication interface circuitry 30. The processing circuitry 40 is configured to receive an RRC release message indicating redirection of the UE 12, and attempt the redirection towards one or more indicated redirection targets, as indicated in the release message. The attempting is subject to an overall limit that bounds the overall number of redirection attempts made by the UE 12 towards the one or more redirection targets, or bounds the overall time allowed for the redirection attempts made by the UE 12 towards the one or more indicated redirection targets. As such, the processing circuitry 40 is configured to, upon reaching the overall limit, attempt redirection towards one or more further redirection targets. At least one of the further redirection targets is not among the one or more indicated redirection targets.

The processing circuitry 40 of the UE 12 in or more embodiments is configured to limit a per-target time spent by the UE 12 in attempting the redirection towards any one of the indicated redirection targets, according to a first timer or counter that limits the number of random access attempts or associated LBT procedures that are permitted for the indi- cated redirection target before the UE 12 is triggered to try a next one of the indicated redirection targets.

For attempting the redirection towards the one or more indicated redirection targets subject to the overall limit, the processing circuitry 40 is configured to limit the overall time spent by the UE 12 in attempting the redirection towards the indicated redirection targets, according to a second timer or counter that limits the overall number of random access attempts or associated LTB procedures that are permitted overall for the indicated redirection targets. The processing circuitry 40 is configured to, in response to reaching the limit defined by the second timer or counter, select one or more further cells 24 or cell parts as the one or more further redirection targets, and attempt redirection towards one or more of the one or more further redirection targets.

To attempt the redirection towards a currently-selected one of the one or more indicated redirection targets, the processing circuitry 40 in at least one embodiment is con- figured to perform one or more random access attempts towards the currently-selected redirection target, each ran- dom access attempt conditioned on performing an LBT procedure. The processing circuitry 40 in one or more such embodiments is configured to select a next, remaining one of the one or more indicated redirection targets upon reaching a limit on the number of redirection attempts or the time allowed for attempting redirection towards the currently- selected redirection target. The limit on the number of redirection attempts comprises, for example, a limit on the number of random access attempts or associated LBT pro- cedures permitted for the currently-selected redirection tar- get.

The one or more indicated redirection targets are one or more cells 24 or parts of cells, of the wireless communica- tion network 10.

For attempting redirection towards the one or more fur- ther redirection targets, the processing circuitry 40 in one or more embodiments is configured to trigger a redirection failure recovery procedure in response to reaching the overall limit for attempting redirection towards the one or more indicated redirection targets. To perform the redirec- tion failure recovery procedure, the processing circuitry 40 is configured to select a cell 24 of the wireless communi- cation network 10 for attempting access, without restricting cell selection to a list of cells or carrier frequencies indicated in or in association with the RRC release message.

In one or more embodiments, the processing circuitry 40 is configured to receive signaling indicating one or more configuration parameter values for the UE 12 to use for triggering the redirection failure recovery procedure and/or use a predefined value or uses a rule to determine a value, for one or more configuration parameters used by the UE 12 for triggering the redirection failure recovery procedure.

FIG. 6 illustrates an example embodiment of a radio network node 22 as an example of a "network node" that is configured to carry out the network-side operations described herein for configuring a redirection procedure performed by a UE 12 and a redirection failure recovery procedure performed by the UE 12.

The radio network node 22 in an example implementation includes communication interface circuitry 50, including one or more kinds of transmitter circuitry 54 and receiver circuitry 52, e.g., cellular-radio circuitry for communicating with UEs via antenna(s) 56, or a computer-network interface or other circuitry for communicatively coupling to a network node having radio connectivity for communicating with UEs. The communication interface circuitry 50 also may include communication interface circuits for communicating with other network nodes 22 and/or for communicating with other nodes in the network 10, such as core-network nodes.

Other elements of the example network node 22 include processing circuitry 60 comprising fixed circuitry or programmatically-configured circuitry, or a mix of fixed circuitry and programmatically configured circuitry. In at least one embodiment, the processing circuitry 60 comprises one or more microprocessors, microcontrollers, Digital Signal Processors (DSPs), Field Programmable Gate Arrays (FPGAs), Application Specific Integrated Circuits (ASICs), or other digital processing circuitry that is/are specially adapted to carry out the operations described herein for a network node, based on the execution of computer program instructions.

Correspondingly, the processing circuitry 60 includes or is associated with storage 62, e.g., for storing the computer program instructions as one or more computer programs 64 and storing one or more items of configuration data. The storage 62 comprises one or more types of computer-readable media, such as working memory for "live" operation of the wireless device 12 and program or long-term memory or other storage, for longer-term retention of the computer program(s) 64 and configuration data. Examples include any one or more of SRAM, DRAM, FLASH, Solid State Disk (SSD), EEPROM, and magnetic storage media.

The network node 22 in one or more embodiments further includes power supply circuitry 66, where the power supply circuitry 66 is configured to supply power to the network node 22. In an example implementation, the power supply circuitry 66 includes one or more regulation circuits configured to provide operating power to one or more elements or subsystems of the network node, based on input power from a battery or other source.

The processing circuitry 60 is operatively associated with the communication interface circuitry 50. "Operatively associated" means, among other things, that the processing circuitry 60 uses the communication interface circuitry 50 to exchange information with one or more external processing entities, e.g., in other nodes or functions, such as other network nodes and/or UEs 12. Further, the processing circuitry 60 is configured to carry out the network-side operations described herein for carrying out a redirection procedure and a redirection failure recovery procedure.

In one or more embodiments, a network node 22 is configured for operation in a wireless communication network 10, where the network node 22 comprises communication interface circuitry 50 and processing circuitry 60. The processing circuitry 60 is configured to send, via the communication interface circuitry 50, configuration information to a UE 12, indicating one or more configuration parameter values for the UE 12 to use for triggering a redirection failure recovery procedure while performing a redirection procedure.

For example, the processing circuitry 60 is configured to indicate the one or more configuration parameter values in a release message sent to the UE 12, in conjunction with releasing the UE 12 from a connected mode. The release message, for example, is an RRC message sent to the UE 12 in conjunction with releasing the UE 12 from an RRC_CONNECTED mode.

The processing circuitry 60 in one or more embodiments is further configured to determine the configuration information. The configuration information defines, for example, an overall limit on the number of redirection attempts by the UE 12 or the time spent by the UE 12 attempting redirection, for the redirection procedure, such that the UE 12 triggers a redirection failure recovery procedure upon reaching the overall limit. In at least one embodiment, the configuration information also defines a limit on the number of redirection attempts made by the UE 12 towards any particular one of one or more redirection targets indicated for the redirection procedure, or the time permitted to the UE 12 for attempting redirection to any particular one of the one or more indicated redirection targets.

FIG. 7 is a logic flow diagram of an example embodiment of a method of operation by a wireless device 12. The method 700 includes the UE 12 receiving (Block 702) an RRC release message indicating redirection of the UE 12. The method 700 further includes the UE 12 attempting (Block 704) the redirection towards one or more indicated redirection targets, as indicated in the release message, subject to an overall limit that bounds the overall number of redirection attempts made by the UE 12 towards the one or more redirection targets, or bounds the overall time allowed for the redirection attempts made by the UE 12 towards the one or more indicated redirection targets. Further, upon reaching the overall limit, the method 700 includes the UE 12 attempting (Block 706) redirection towards one or more further redirection targets, wherein at least one of the further redirection targets is not among the one or more indicated redirection targets.

In at least one embodiment, the method 700 includes the UE 12 limiting a per-target time spent by the UE 12 in attempting the redirection towards any one of the indicated redirection targets, according to a first timer or counter that limits the number of random access attempts or associated LBT procedures that are permitted for the indicated redirection target before the UE 12 is triggered to try a next one of the indicated redirection targets.

Attempting (Block 706) the redirection towards the one or more indicated redirection targets subject to the overall limit comprises, for example: limiting the overall time spent by the UE 12 in attempting the redirection towards the indicated redirection targets, according to a second timer or counter that limits the overall number of random access attempts or associated LTB procedures that are permitted overall for the indicated redirection targets, and, responsive to reaching the limit defined by the second timer or counter, the UE 12 selecting one or more further cells 24 or cell parts as the one or more further redirection targets, and attempting redirection towards one or more of the one or more further redirection targets.

Attempting the redirection towards a currently-selected one of the one or more indicated redirection targets comprises, for example, the UE 12 performing one or more random access attempts towards the currently-selected redirection target, each random access attempt conditioned on performing an LBT procedure. The method 700 may include the UE 12 selecting a next, remaining one of the one or more indicated redirection targets upon reaching a limit on the number of redirection attempts or the time allowed for attempting redirection towards the currently-selected redirection target. Further, the limit on the number of redirection attempts comprises, for example, a limit on the number of random access attempts or associated LBT procedures permitted for the currently-selected redirection target.

The one or more indicated redirection targets are one or more cells 24 or parts of cells, of a wireless communication network 10.

Attempting (Block 706) redirection towards the one or more further redirection targets comprises, for example, triggering a redirection failure recovery procedure in response to reaching the overall limit for attempting redirection towards the one or more indicated redirection targets. Correspondingly, the UE 12 performing the redirection failure recovery procedure comprises the UE 12 selecting a cell 24 of a wireless communication network 10 for attempting access, without restricting cell selection to a list of cells 24 or carrier frequencies indicated in or in association with the RRC release message.

In at least one embodiment, the method 700 further includes the UE 12 receiving signaling indicating one or more configuration parameter values for the UE 12 to use for triggering the redirection failure recovery procedure and/or the UE 12 using a predefined value or rule to determine a value, for one or more configuration parameters used by the UE 12 for triggering the redirection failure recovery procedure.

FIG. 8 is a logic flow diagram of another example embodiment of a method of operation by a UE 12. The method 800 includes the UE 12 performing (Block 802) a redirection procedure according to a first limit that bounds redirection attempts made by the UE 12 towards each redirection target, among one or more redirection targets indicated for the redirection procedure, and further according to a second limit that bounds the redirection procedure. The method 800 further includes the UE 12 performing (Block 804) a redirection failure recovery procedure, responsive to reaching the second limit during performance of the redirection procedure.

FIGS. 9 and 10 are logic flow diagrams of further example embodiments of a method of operation by a wireless device 12. In FIG. 9, the method 900 includes a UE 12 performing (Block 902) an LBT failure detection and recovery procedure during an RRC redirection procedure involving one or more target cells of a redirected carrier indicated in an RRC release message with redirection.

In FIG. 10, the method 1000 includes a UE 12 performing (Block 1002) random access towards one or more of the (indicated) target cells, based on the UE 12 performing limited number of random access attempts towards any currently selected one of the target cells before selecting another one of the target cells 24 to try, according to a first timer or counter that limits the number of LBT failures or random access failures that the UE 12 is permitted to experience in association with attempting random access towards the currently-selected target cell 24. Further, the method 1000 includes the UE 12 performing (Block 1004), as a redirection failure recovery procedure, random access towards one or more further cells 24 that are not necessarily among the target cells (indicated in the release message). The UE 12 performs such operations responsive to detecting a redirection failure. In one or more embodiments, the UE 12 detects the redirection failure as the UE 12 reaching a limit on the overall number of LBT failures or random access failures that the UE 12 is permitted to experience in the redirection procedure with respect to the target cells 24, or reaching a limit on the overall time the UE 12 is permitted to expend for attempting random access with respect to the target class.

Figure 11:
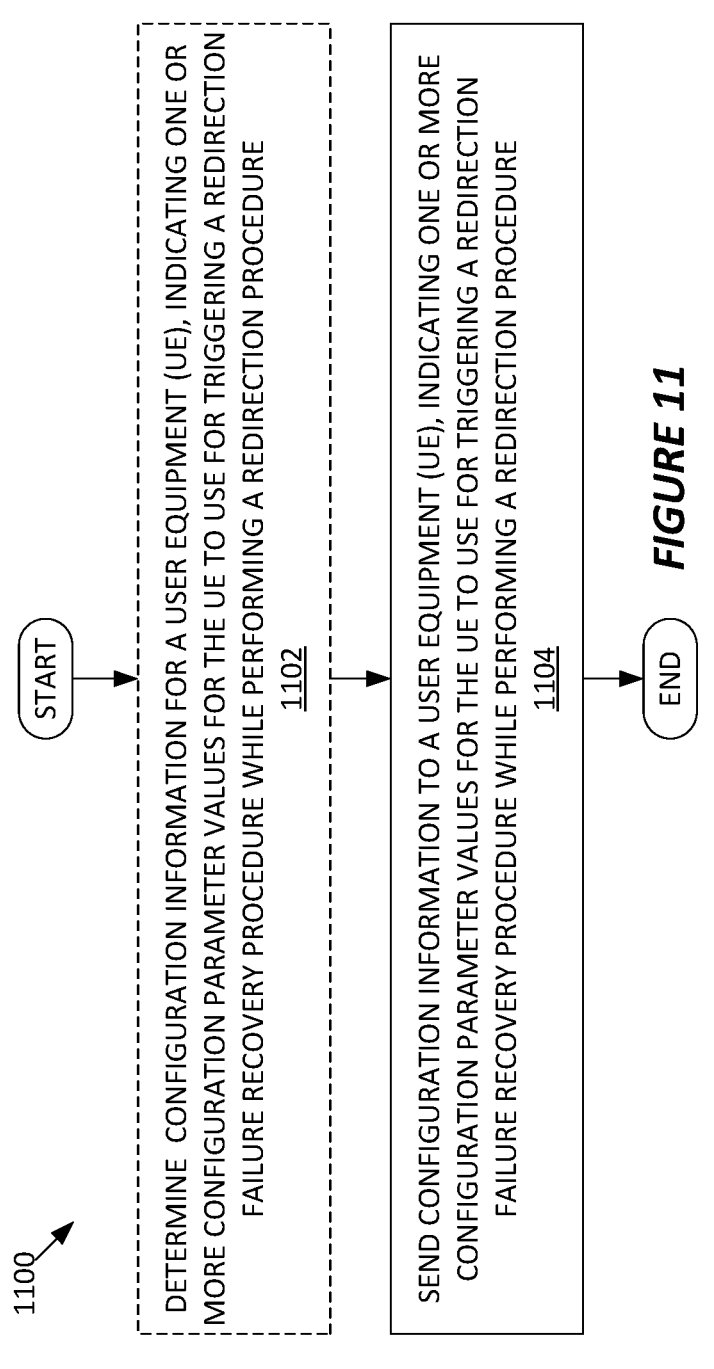
FIG. 11 is a block diagram of one embodiment of a method of operation by a network node.

FIG. 11 is a logic flow diagram of an example embodiment of a method 1100 of operation by a network node, e.g., a radio network node 22 depicted in FIG. 4. The method 1100 includes the network node sending (Block 1104) configuration information to a UE 12. The configuration information indicates one or more configuration parameter values for the UE 12 to use for triggering a redirection failure recovery procedure while performing a redirection procedure. The method 1100 may further include the network node determining (Block 1102) the configuration information for the UE 12.

Figure 12:
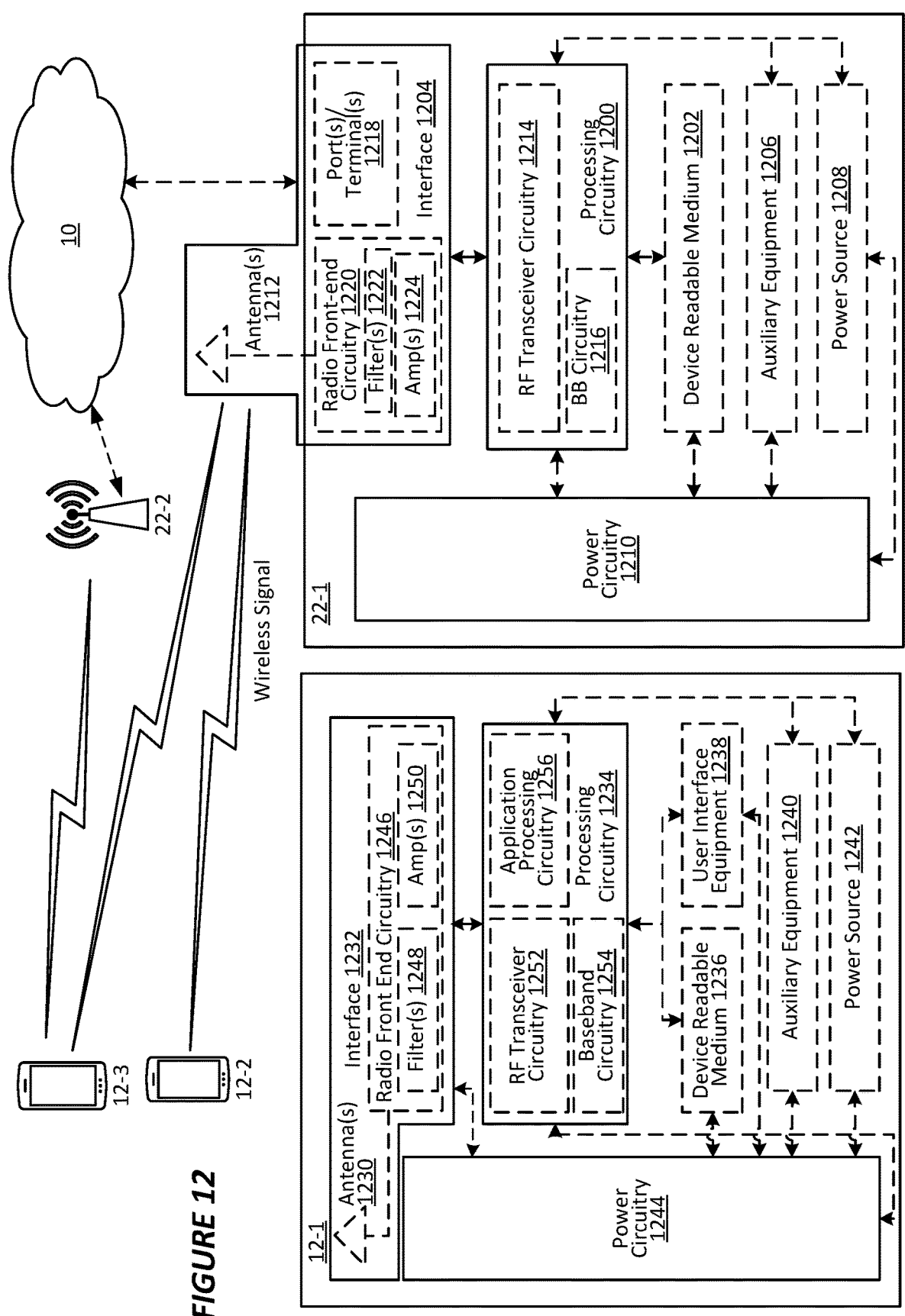
FIG. 12 is a block diagram of another embodiment of a wireless communication network, shown in relation to wireless devices configured to use the network.

FIG. 12 depicts another embodiment of a wireless network in accordance with some embodiments.

Although the subject matter described herein may be implemented in any appropriate type of system using any suitable components, the embodiments disclosed herein are described in relation to the example wireless network 10 illustrated in FIG. 12. For simplicity, the wireless network of FIG. 12 only depicts the network 10 with network nodes 22-1 and 22-2, and wireless devices (wireless devices) 12-1, 12-2, and 12-3. In this example, the network nodes 22 are operative as radio access nodes of the network 10—see, e.g., the radio access nodes 22 of FIG. 4, for example.

In practice, the network 10 may further include any additional elements suitable to support communication between wireless devices or between a wireless device and another communication device, such as a landline telephone, a service provider, or any other network node or end device. Of the illustrated components, the network node 22-1 and the wireless device 12-1 are depicted with additional detail. The wireless network 10 may provide communication and other types of services to one or more wireless devices to facilitate access to and/or use of the services provided by, or via, the wireless communication network 10. In particular, one or more of the wireless devices 12 and one or more of the network nodes 22 are configured to perform the techniques discussed herein for redirection procedures and redirection failure recovery procedures, e.g., uplink LBT failure recovery.

The wireless communication network 10 may comprise and/or interface with any type of communication, telecommunication, data, cellular, and/or radio network or other similar type of system. In some embodiments, the wireless communication network 10 is configured to operate according to specific standards or other types of predefined rules or procedures. Thus, particular embodiments of the wireless communication network 10 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. The wireless devices 12 configured to access and use the wireless communication network 10 may utilize any combination of RATs.

In one or more embodiments, the network 10 comprises one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices, such as between wireless devices 12 and remote servers or other equipment.

For operation according to the techniques disclosed herein, the example network node 22 and the example wireless device 12 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, the term "network node" broadly refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless communication network 10. Examples of a "network node" include, but are not limited to, access points (APs) (e.g., radio access points), base stations (BSs) (e.g., radio base stations, Node Bs, evolved Node Bs (eNBs) and NR NodeBs (gNBs)), as discussed above. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device 12 with access to the wireless communication network 10 or to provide some service to a wireless device 12 that has accessed the wireless communication network 10.

In FIG. 12, the example network node 22-1 includes processing circuitry 1200, device readable medium 1202, interface 1204, auxiliary equipment 1206, power source 1208, power circuitry 1210, and antenna 1212. Although the network node 22-1 illustrated in the example wireless communication network 10 of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 22-1 are depicted as single boxes located within a larger box, or nested within multiple boxes, in practice, a network node 22 may comprise multiple different physical components that make up a single illustrated component (e.g., device readable medium 1202 may comprise multiple separate hard drives as well as multiple RAM modules).

Recognizing that any one or more network nodes 22 may have the configuration of the network node 22-1 depicted in FIG. 12, further references to example details for the operations and componentry of the network node 22-1 drop the suffixing, in favor of referring simply to a network node 22. As noted, in an example embodiment, the network node 22 is a radio access node, such as shown in FIG. 4, but that is a non-limiting example and the network node 22 does not necessarily operate as a radio access node in the network 10.

The network node 22 may be composed of multiple physically separate components (e.g., a NodeB component and a Radio Network Controller (RNC) component, or a Base Transceiver Station (BTS) component and a Base Station Controller (BSC) component, etc.), which may each have their own respective components. In certain scenarios in which the network node 22 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 22 is configured to support multiple radio access technologies (RATs).

In at least one such embodiment, some components are duplicated (e.g., separate device readable medium 1202 for the different RATs) and some components may be reused (e.g., the same antenna 1212 may be shared by the RATs). The network node 22 in one or more embodiments also includes multiple sets of the various illustrated components for different wireless technologies integrated into the network node 22, such as, for example, GSM, WCDMA, LTE, NR, WI-FI, or BLUETOOTH wireless technologies. These wireless technologies may be integrated into the same or different chip or set of chips and other components within the network node 22.

The processing circuitry 1200 is configured to perform any determining, calculating, or similar operations (e.g., certain obtaining operations) described herein as being provided by a network node 22. These operations performed by the processing circuitry 1200 may include processing information obtained by the processing circuitry 1200 by, for example, converting the obtained information into other information, comparing the obtained information or converted information to information stored in the network node 22, and/or performing one or more operations based on the obtained information or converted information, and as a result of said processing making a determination.

In one or more embodiments, the processing circuitry 1200 comprises a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide the network-node functionality described herein, either alone or in conjunction with other components of the network node 22, such as the device readable medium 1202. For example, in at least one embodiment, the processing circuitry 1200 executes instructions stored in the device readable medium 1202 or in memory within the processing circuitry 1200. Such functionality may include providing any of the various wireless features, functions, or benefits discussed herein. In some embodiments, the processing circuitry 1200 comprises a system on a chip (SOC).

In some embodiments, the processing circuitry 1200 includes one or more of a radio frequency (RF) transceiver circuitry 1214 and baseband processing circuitry 1216. In some embodiments, RF transceiver circuitry 1214 and baseband processing circuitry 1216 may be on separate chips (or sets of chips), boards, or units, such as radio units and digital units. FIG. 12 denotes the baseband processing circuitry 1216 as "BB Circuitry 1216" for brevity. In one or more alternative embodiments, part or all of RF transceiver circuitry 1214 and baseband processing circuitry 1216 are on the same chip or set of chips, boards, or units.

Further, in one or more embodiments, some or all of the functionality described herein as being provided by a network node 22 is performed by processing circuitry 1200 executing instructions stored on device readable medium 1202 or memory within processing circuitry 1200. In alternative embodiments, some or all the functionality of the network node 22 is realized by the processing circuitry 1200 without executing instructions stored on a separate or discrete device readable medium. That is, the processing circuitry 1200 has a hard-wired configuration in such embodiments. Regardless of its implementation particulars, the processing circuitry 1200 is configured to perform the functionality described herein for a network node 22. The benefits provided by such functionality are not limited to the processing circuitry 1200 alone or to other components of the network node 22, but are enjoyed by the network node 22 as a whole, and/or by the wireless communication network 10 generally and/or respective ones of the wireless devices 12 using the wireless communication network 10 as "end users".

The device readable medium 1202 comprises any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1200. The device readable medium 1202 in one or more embodiments stores suitable instructions, data or other information, including a computer program, software, an application including one or more of logic, rules, code, tables, etc. and/or other instructions that are readable or otherwise executable by the processing circuitry 1200, and utilized by the network node 22. In at least one embodiment, the device readable medium 1202 stores calculations made by the processing circuitry 1200 and/or any data received via the interface 1204. In some embodiments, the processing circuitry 1200 and the device readable medium 1202 are integrated.

The interface 1204 is used in the wired or wireless communication of signaling and/or data between the network node 22 and one or more other nodes or components in the network, and/or between the network node 22 and one or more wireless devices 12. As illustrated, the interface 1204 comprises port(s)/terminal(s) 1218 to send and receive data, for example to and from one or more other components of the network 10 over a wired connection. The interface 1204 also includes radio front end circuitry 1220 that may be coupled to, or in certain embodiments a part of, the antenna(s) 1212. The radio front end circuitry 1220 comprises one or more filters 1222 and one or more amplifiers 1224—depicted in FIG. 12 as "Amp(s) 1224". The radio front end circuitry 1220 in one or more embodiments is connected to the antenna(s) 1212 and the processing circuitry 1200. For example, the radio front end circuitry 1220 is configured to condition signals communicated between the antenna(s) 1212 and the RF transceiver circuitry 1214 and the baseband processing circuitry 1216 included in or associated with the processing circuitry 1200. Further, in one or more embodiments, the radio front end circuitry 1220 receives digital data that is to be sent out to other nodes in the network 10 or to wireless devices 12 via a wireless connection. For example, the radio front end circuitry 1220 is configured to convert the digital data into a radio signal having the appropriate channel and bandwidth parameters using a combination of the filter(s) 1222 and/or the amplifier(s) 1224. The radio signal may then be transmitted via the antenna(s) 1212. Similarly, when receiving data, the antenna(s) 1212 may collect radio signals which are then converted into digital data by the radio front end circuitry 1220. The digital data may be passed to processing circuitry 1200. In other embodiments, the interface may comprise different components and/or different combinations of components. For example, the baseband circuitry 1216 processes outgoing data for transmission in the digital domain and the RF transceiver circuitry 1214 generates a corresponding modulated signal, for further amplification via the radio front-end circuitry 1220, for transmission via the antenna(s) 1212. A similar radio-signal processing chain applies in reverse, with the radio front-end circuitry 1220 providing a filtered and amplified version of incoming antenna signals to the RF transceiver circuitry 1214 for down-conversion and digitization, with the baseband processing circuitry 1216 processing the digitized signal samples for information recovery.

In certain alternative embodiments, network node 22 does not include separate radio front end circuitry 1220. Instead, the processing circuitry 1200 comprises radio front end circuitry and may be connected to the antenna(s) 1212 without using a separate radio front end circuitry 1220. Similarly, in some embodiments, all or some of the RF transceiver circuitry 1214 may be considered a part of the interface 1204. In still other embodiments, the interface 1204 may include one or more ports or terminals 1218, the radio front end circuitry 1220, and the RF transceiver circuitry 1214, as part of a radio unit (not shown), and the interface 1204 may communicate with the baseband processing circuitry 1216, which is part of a digital unit (not shown).

The antenna(s) 1212 include one or more antennas, or antenna arrays, configured to send and/or receive wireless signals. The antenna(s) 1212 may be coupled to the radio front end circuitry 1220 and may be any type of antenna(s) capable of transmitting and receiving data and/or signals wirelessly. In some embodiments, the antenna(s) 1212 comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple-Input-Multiple-Output (MIMO). In certain embodiments, the antenna(s) 1212 are separate from the network node 22 and are connectable to the network node 22 through an interface or port.

In one or more embodiments, the antenna(s) 1212, the interface 1204, and/or the processing circuitry 1200 is/are configured to perform any receiving operations and/or certain obtaining operations described herein as being performed by a network node 22. Any information, data and/or signals may be received from a wireless device, another network node and/or any other network equipment. Similarly, the antenna(s) 1212, the interface 1204, and/or the processing circuitry 1200 may be configured to perform any transmitting operations described herein as being performed by a network node 22. Any information, data and/or signals may be transmitted to a wireless device, another network node and/or any other network equipment.

The power circuitry 1210 comprises or is coupled to power management circuitry and is configured to supply the components of the network node 22 with power for performing the functionality described herein. The power circuitry 1210 receives power, for example, from the power source 1208. The power source 1208 and/or the power circuitry 1210 may be configured to provide power to the various components of network node 22 in a form suitable for the respective components, e.g., at a voltage and current level needed for each respective component. The power source 1208 may be included in the power circuitry 1210 or may be external to the power circuitry 1210 or the network node 22 at large. For example, the network node 22 in one or more configurations is connectable to an external power source, such as an electricity outlet, via an input circuitry or interface such as an electrical cable, whereby the external power source supplies power to the power circuitry 1210. As a further example, the power source 1208 may comprise a source of power in the form of a battery or battery pack which is connected to, or integrated in, the power circuitry 1210. The battery serves as a backup power source in one or more embodiments, should an external power source fail. Other types of power sources, such as photovoltaic devices, may also be used.

Alternative embodiments of network node 22 may include additional components beyond those shown in FIG. 12 that may be responsible for providing certain functions of the network node 22, including any of the functionality described herein and/or any functionality necessary to support the subject matter described herein. For example, network node 22 may include user interface equipment (not shown) to allow the input of information into the network node 22 and to allow output of information from the network node 22. These input/output functions allow a user to perform diagnostic, maintenance, repair, and other administrative functions for the network node 22.

As used herein, the term "wireless device" or "wireless device" refers to a device capable, configured, arranged and/or operable to communicate wirelessly with network nodes and/or other wireless devices. Unless otherwise noted, the term wireless device may be used interchangeably herein with "User Equipment" or "UE". Thus, a wireless device comprises essentially any type of wireless communication apparatus that is configured to access and use a wireless communication network, such as the network 10. For example, a wireless device uses the network 10 as an "access network" for communicating with other wireless devices and/or for gaining access to a server or other device, system, or equipment, that is available via the Internet or other network accessible via the network 10.

Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as a Machine Type Communication (MTC) device. As one example, a wireless device is a UE implementing the 3GPP narrow band internet of things (NB-IoT) standard. Specific examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a wireless device is part of or associated with a vehicle or other equipment and is configured for monitoring and/or reporting on the operational status or other functions associated with operation of the vehicle or other equipment. A wireless device as described herein also may represent the endpoint of a wireless connection, in which case the wireless device may be referred to as a "wireless terminal". Furthermore, a wireless device as described above may be mobile, in which case it may also be referred to as a "mobile device" or a "mobile terminal".

FIG. 12 illustrates example details for implementation of a wireless device, shown in the context of wireless device 12-1. However, as wireless device 12-1 stands as a general but non-limiting example of implementing a wireless device 12 having the functionality described herein, the following details refer generally to a wireless device 12.

The depicted wireless device 12 includes antenna(s) 1230, an interface 1232, processing circuitry 1234, a device readable medium 1236, user interface equipment 1238, auxiliary equipment 1240, a power source 1242, and power circuitry 1244. The wireless device 12 may include multiple sets of one or more of the illustrated components for different wireless technologies supported by wireless device 12, such as, for example, GSM, WCDMA, LTE, NR, WI-FI, WiMAX, or BLUETOOTH wireless technologies, just to mention a few. These wireless technologies may be integrated into the same or different chips or set of chips as other components within the wireless device 12.

The antenna(s) 1230 may include one or more antennas or antenna arrays, configured to send and/or receive wireless signals, and is/are connected to the interface 1232. In certain alternative embodiments, the antenna(s) 1230 are separate from the wireless device 12 and connect to the wireless device 12 through an interface or port. The antenna(s) 1230, the interface 1232, and/or the processing circuitry 1234 may be configured to perform any receiving or transmitting operations described herein as being performed by a wireless device. Any information, data and/or signals may be received from a network node, such as a network node 22, and/or another wireless device. In some embodiments, radio front end circuitry and/or the antenna(s) 1230 may be considered as one type of interface included in the wireless device 12.

In the illustration, for example, the interface 1232 comprises radio front end circuitry 1246 and antenna 1230. The radio front end circuitry 1246 comprises one or more filters 1248 and one or more amplifiers 1250, labeled as "Amp(s) 1250". The radio front end circuitry 1246 connects to the antenna(s) 1230 and the processing circuitry 1234 and is configured to condition signals communicated between the antenna(s) 1230 and the processing circuitry 1234. Broadly, the radio front end circuitry 1246 may be coupled to or a part of the antenna(s) 1230.

In some embodiments, the wireless device 12 does not include separate radio front end circuitry 1246. Instead, the processing circuitry 1234 includes radio front end circuitry 1246 and connects to the antenna(s) 1230. For example, the processing circuitry 1234 includes or is associated with RF transceiver circuitry 1252, which may be considered a part of the interface 1232, at least on a functional basis.

However it is implemented within the wireless device 12, the radio front end circuitry 1246 may receive digital data that is to be sent out to other network nodes or wireless devices via a wireless connection. In one or more embodiments, the radio front end circuitry 1246 is configured to convert the digital data into a radio signal having the appropriate channel and bandwidth parameters using a combination of the filter(s) 1248 and/or the amplifier(s) 1250. The radio signal is then transmitted via the antenna(s) 1230. Similarly, for receiving radio signals, the antenna(s) 1230 may collect the radio signals which are then converted into digital data by the radio front end circuitry 1246. The digital data passes to the processing circuitry 1234, for processing, e.g., the recovery of data or control signaling. In other embodiments, the interface may comprise different components and/or different combinations of components.

The processing circuitry 1234 in one or more embodiments comprises a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide the functionality attributed herein to a wireless device 12, either alone or in conjunction with other components of the wireless device 12, such as the device readable medium 1236, the interface 1232, etc. Such functionality may include providing any of the various wireless features or benefits discussed herein. For example, the processing circuitry 1234 may execute instructions stored in the device readable medium 1236 or in memory within processing circuitry 1234 to provide the functionality disclosed herein.

In at least one embodiment, the processing circuitry 1234 includes one or more of RF transceiver circuitry 1252, baseband processing circuitry 1254, and application processing circuitry 1256. In other embodiments, the processing circuitry 1234 comprises different components and/or different combinations of components. In at least one embodiment of the wireless device 12, the processing circuitry 1234 comprises a SOC.

Further, in one or more embodiments, the RF transceiver circuitry 1252, the baseband processing circuitry 1254, and the application processing circuitry 1256 are on separate chips or sets of chips. As an alternative, part or all of the baseband processing circuitry 1254 and the application processing circuitry 1256 are combined into one chip or set of chips, and the RF transceiver circuitry 1252 is on a separate chip or set of chips. In still other embodiments, part or all of the RF transceiver circuitry 1252 and the baseband processing circuitry 1254 are on the same chip or set of chips, and the application processing circuitry 1256 is on a separate chip or set of chips. As a further alternative, part or all of the RF transceiver circuitry 1252, the baseband processing circuitry 1254, and the application processing circuitry 1256 are combined in the same chip or set of chips. In at least one embodiment, the RF transceiver circuitry 1252 is a part of the interface 1232, at least functionally.

As such, the RF transceiver circuitry 1252 may condition RF signals for the processing circuitry 1234. For example, radio signals incoming via the antenna(s) 1230 undergo initial conditioning in the radio front end circuitry 1246, such as filtering and amplification. The conditioned incoming signals undergo down-conversion, demodulation, and digitization via the RF transceiver circuitry 1252, and the baseband circuitry 1254 processes the digitized signal samples to recover the contained information, e.g., user-plane data and/or control signaling. Similar processing in the reverse radio-chain direction applies for data and control signaling to be transmitted by the wireless device via the antenna(s) 1230.

In certain embodiments, some or all of the functionality described herein as being performed by a wireless device may be provided by the processing circuitry 1234 executing instructions stored on the device readable medium 1236, which in certain embodiments may be a computer-readable storage medium. In alternative embodiments, some or all the functionality is provided by the processing circuitry 1234 without executing instructions stored on a separate or discrete device readable storage medium, such as where the processing circuitry 1234 is hard-wired. Whether hard-wired or programmatically configured according to the execution of program instructions, the processing circuitry 1234 performs the described functionality. The benefits provided by such functionality are not limited to the processing circuitry 1234 alone or to other components of the wireless device 12 but are enjoyed by the wireless device 12 as a whole, as an end user of the wireless communication network 10.

The processing circuitry 1234 may be configured to perform any determining, calculating, or similar operations (e.g., certain obtaining operations) described herein as being performed by a wireless device. These operations, as performed by the processing circuitry 1234, may include processing information obtained by processing circuitry 1234 by, for example, converting the obtained information into other information, comparing the obtained information or converted information to information stored by the wireless device, and/or performing one or more operations based on the obtained information or converted information, and as a result of said processing making a determination.

The device readable medium 1236 in one or more embodiments stores a computer program, an application or other software including one or more of logic, rules, code, tables, etc., and/or other instructions that are executable by the processing circuitry 1234. As an example, the device readable medium 1236 includes computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions for reading and/or executing by the processing circuitry 1234. In some embodiments, the processing circuitry 1234 and the device readable medium 1236 are integrated.

In at least one embodiment, the wireless device 12 includes the depicted user interface equipment 1238, and it provides components that allow for a human user to interact with the wireless device 12. Example interactions include any one or more of visual, audial, tactile, etc. The user interface equipment 1238 in one or more embodiments is configured to produce output to a user of the wireless device 12 and to allow the user to provide input to the wireless device 12. The type of interaction varies in dependence on the implementation of the user interface equipment 1238. For example, the user interface equipment 1238 may include a touchscreen for a smartphone implementation of the wireless device 12. In a smart meter implementation of the wireless device 12, the user interface equipment 1238 includes a screen or a speaker for outputting usage information (e.g., the number of gallons used), or for outputting an audible alert (e.g., if smoke is detected). The user interface equipment 1238 includes, for example, one or more input interfaces, devices and circuits, and one or more output interfaces, devices and circuits.

In one or more example configurations, the user interface equipment 1238 is configured to allow input of information into the wireless device 12 and is connected to the processing circuitry 1234 to allow processing circuitry 1234 to process the input information. The user interface equipment 1238 includes, for example, a microphone, a proximity or other sensor, keys/buttons, a touch display, one or more cameras, a USB port, or other input circuitry. The user interface equipment 1238 may also be configured to provide for the output of information from the wireless device 12, and to allow the processing circuitry 1234 to output information from the wireless device 12. For example, in at least one embodiment, the user interface equipment 1238 includes any one or more of a speaker, a display, vibrating circuitry, a USB port, a headphone interface, or other output circuitry. The wireless device 12 may use such circuitry to provide the benefits of its operation to any one or more of a user of the wireless device 12, other wireless devices 12, one or more nodes of the network 10, or one or more servers, equipments, or devices accessible via the network 10.

The auxiliary equipment 1240 in one or more embodiments is operable to provide more specific functionality which may not be generally performed by wireless devices. For example, in at least one embodiment, the auxiliary equipment 1240 comprises specialized sensors for doing measurements for various purposes and/or interfaces for additional types of communication, such as wired communications, etc. The inclusion and type of components of auxiliary equipment 1240 will vary, depending on the embodiment and/or scenario.

In at least one embodiment of the wireless device 12, the power source 1242 is a battery or battery pack. Other types of power sources, such as an external power source (e.g., an electricity outlet), photovoltaic devices or power cells, may also be used. The power circuitry 1244 is configured to deliver power from the power source 1242 to the various parts of the wireless device 12 which need power from the power source 1242 to carry out any functionality described or indicated herein.

The power circuitry 1244 in certain embodiments comprises power management circuitry. The power circuitry 1244 may additionally or alternatively be operable to receive power from an external power source. In such cases, the wireless device 12 is configured for connection to the external power source (such as an electricity outlet) via input circuitry or an interface, such as an electrical power cable. The power circuitry 1244 may also in certain embodiments be configured to deliver power from an external power source to the power source 1242. This may be, for example, for the charging of power source 1242. The power circuitry 1244 may perform any formatting, converting, or other modification to the power from power source 1242 to make the power suitable for the respective components of wireless device 12 to which power is supplied.

Figure 13:
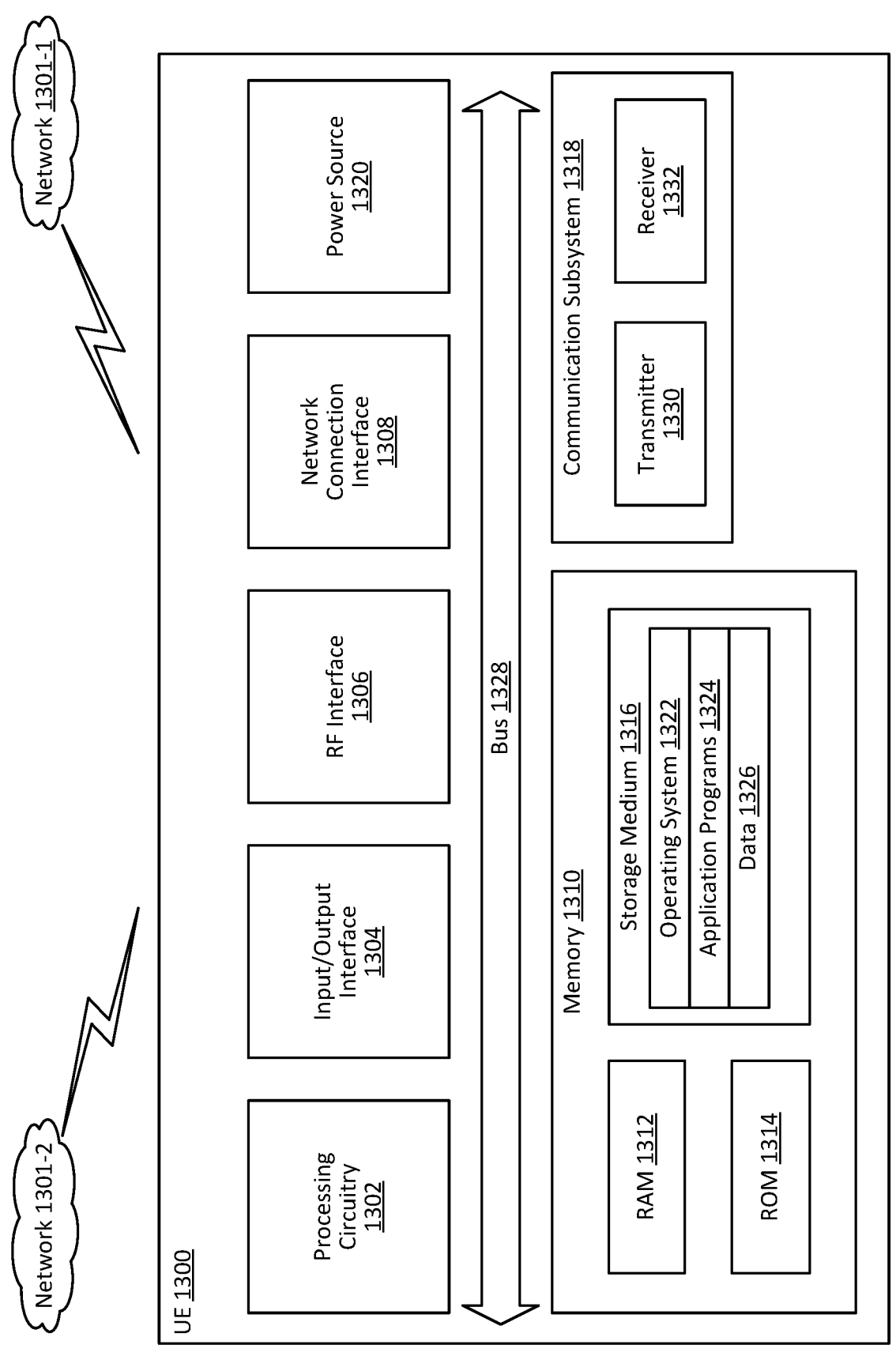
FIG. 13 is a block diagram of another embodiment of a wireless device that is configured to use one or more wireless communication networks of the same or different types.

FIG. 13 illustrates another example embodiment of a wireless device 12, labeled in the diagram as a "UE 1300". As used herein, a user equipment or UE does not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

UE 1300 may be any UE identified by the 3rd Generation Partnership Project (3GPP), including a NB-IoT UE, a machine type communication (MTC) UE, and/or an enhanced MTC (eMTC) UE. UE 1300, as illustrated in FIG. 13, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 13 is a UE, the components discussed herein are equally applicable to a wireless device, and vice-versa.

In FIG. 13, the UE 1300 includes processing circuitry 1302 that is operatively coupled to input/output interface 1304, radio frequency (RF) interface 1306, network connection interface 1308, memory 1310 including random access memory (RAM) 1312, read-only memory (ROM) 1314, storage medium 1316 or the like, communication subsystem 1318, power source 1320, and/or any other component, or any combination thereof. Storage medium 1316 includes operating system 1322, application program 1324, and data 1326. In other embodiments, storage medium 1316 may include other similar types of information. Certain UEs may utilize all the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1302 may be configured to process computer instructions and data. Processing circuitry 1302 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1302 may include two central processing units (CPUs). Data may be information in a form suitable for use by a computer.

In the depicted embodiment, input/output interface 1304 may be configured to provide a communication interface to an input device, output device, or input and output device. UE 1300 may be configured to use an output device via input/output interface 1304. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1304 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1306 may be configured to provide a communication interface to RF components such as a transmitter, a receiver, and an antenna. Network connection interface 1308 may be configured to provide a communication interface to one or more wireless communication networks 1301-1 and/or 1301-2. Here, a network 1301 encompasses wired and/or wireless networks such as a local-area network (LAN), a wide-area network (WAN), a computer network, a wireless network, a telecommunications network, another like network or any combination thereof. For example, a network 1301 may comprise a Wi-Fi network. Network connection interface 1308 may be configured to include a receiver and a transmitter interface used to communicate with one or more other devices over a communication network according to one or more communication protocols, such as Ethernet, TCP/IP, SONET, ATM, or the like. Network connection interface 1308 may implement receiver and transmitter functionality appropriate to the communication network links (e.g., optical, electrical, and the like). The transmitter and receiver functions may share circuit components, software or firmware, or alternatively may be implemented separately.

RAM 1312 may be configured to interface via bus 1328 to processing circuitry 1302 to provide storage or caching of data or computer instructions during the execution of software programs such as the operating system, application programs, and device drivers. ROM 1314 may be configured to provide computer instructions or data to processing circuitry 1302. For example, ROM 1314 may be configured to store invariant low-level system code or data for basic system functions such as basic input and output (I/O), startup, or reception of keystrokes from a keyboard that are stored in a non-volatile memory. Storage medium 1316 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1316 may be configured to include operating system 1322, application program 1324 such as a web browser application, a widget or gadget engine or another application, and data file 1326. Storage medium 1316 may store, for use by UE 1300, any of a variety of various operating systems or combinations of operating systems.

Storage medium 1316 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1316 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1316, which may comprise a device readable medium.

In FIG. 13, processing circuitry 1302 may be configured to communicate with network 1301-2 using communication subsystem 1318. Network 1301-1 and network 1301-2 may be the same network(s) or different networks. Communication subsystem 1318 may be configured to include one or more transceivers used to communicate with network 1301-1 and/or 1301-2. For example, communication subsystem 1318 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 1330 and/or receiver 1332 to implement transmitter or receiver functionality, respectively, appropriate to the RAN links (e.g., frequency allocations and the like). Further, transmitter 1330 and receiver 1332 of each transceiver may share circuit components, software or firmware, or alternatively may be implemented separately.

In the illustrated embodiment, the communication functions of communication subsystem 1318 may include data communication, voice communication, multimedia communication, short-range communications such as BLUETOOTH, near-field communication, location-based communication such as the use of the global positioning system (GPS) to determine a location, another like communication function, or any combination thereof. For example, communication subsystem 1318 may include cellular communication, WI-FI communication, BLUETOOTH communication, and GPS communication. Network 1301-1 or 1301-2 may encompass wired and/or wireless networks such as a local-area network (LAN), a wide-area network (WAN), a computer network, a wireless network, a telecommunications network, another like network or any combination thereof. For example, a network 1301 may be a cellular network, a WI-FI network, and/or a near-field network.

Power source 1320 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1318 may be configured to include any of the components described herein. Further, processing circuitry 1302 may be configured to communicate with any of such components over bus 1328. In another example, any of such components may be represented by program instructions stored in memory that when executed by processing circuitry 1302 perform the corresponding functions described herein. In another example, the functionality of any of such components may be partitioned between processing circuitry 1302 and communication subsystem 1318. In another example, the non-computationally intensive functions of any of such components may be implemented in software or firmware and the computationally intensive functions may be implemented in hardware.

Figure 14:
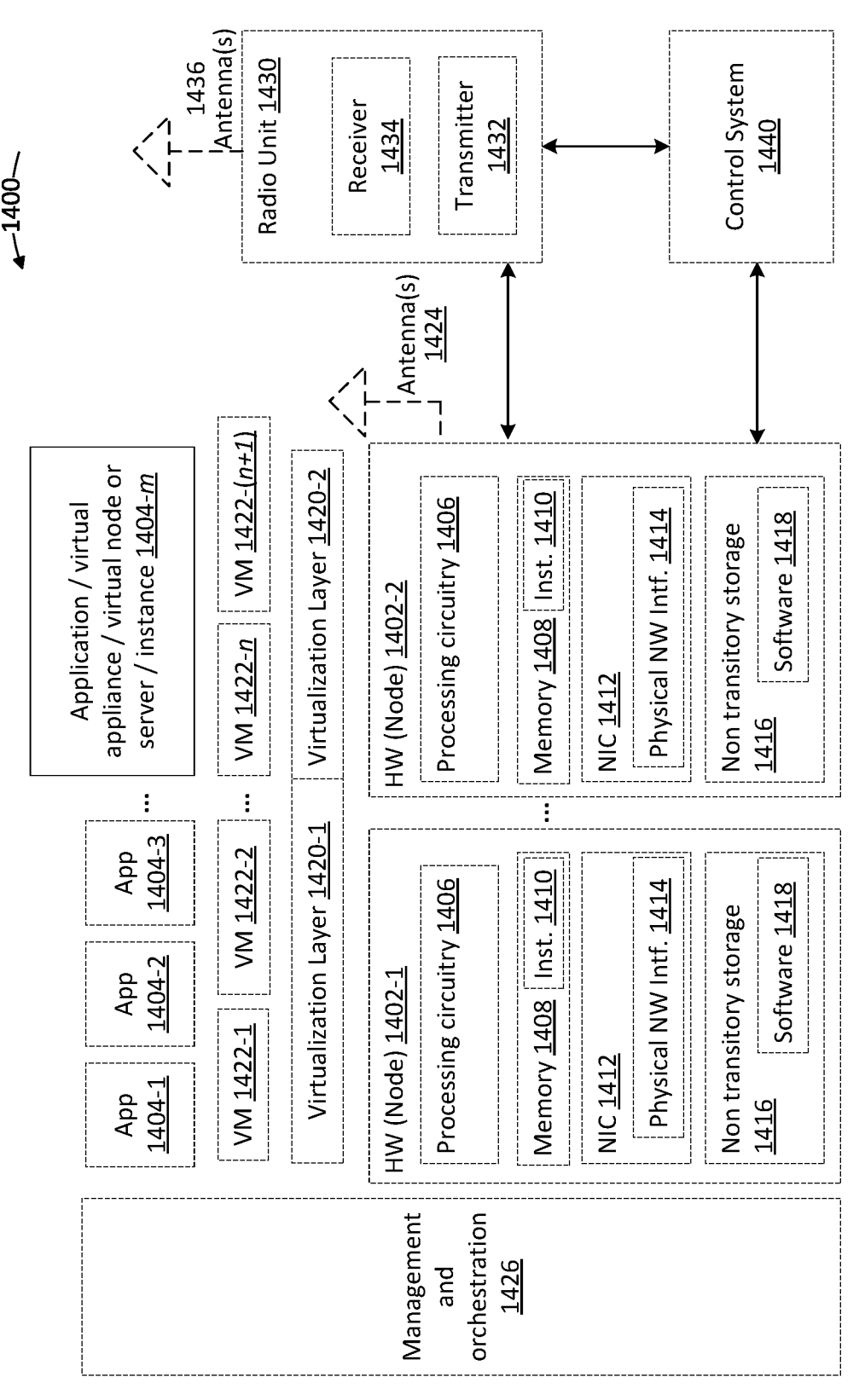
FIG. 14 is a block diagram of one embodiment of a virtualization environment.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all the functions described herein may be implemented as virtual components executed by one or more virtual machines implemented in one or more virtual environments 1400 hosted by one or more of hardware nodes 1402, e.g., nodes 1402-1 and 1402-2. Further, in embodiments in which the virtual node is not a radio access node or does not require radio connectivity (e.g., a core network node), then the network node may be entirely virtualized.

The functions may be implemented by one or more applications 1404 (which may alternatively be called software instances, virtual appliances, network functions, virtual nodes, virtual network functions, etc.) operative to implement some of the features, functions, and/or benefits of some of the embodiments disclosed herein. Applications 1404 are run in virtualization environment 1400 which provides hardware 1402 comprising processing circuitry 1406 and memory 1408. Memory 1408 contains instructions 1410 executable by processing circuitry 1406 whereby an instance of an application 1404 is operative to provide one or more of the features, benefits, and/or functions disclosed herein. Illustrated applications or application instances include application 1404-1, 1404-2, 1404-3, through 1404-$m$, where m is an integer value representing the m-th application or application instance in the virtualization environment 1400.

Virtualization environment 1400, comprises general-purpose or special-purpose network hardware devices 1402 comprising a set of one or more processors or processing circuitry 1406, which may be commercial off-the-shelf (COTS) processors, dedicated Application Specific Integrated Circuits (ASICs), or any other type of processing circuitry including digital or analog hardware components or special purpose processors. Each hardware device may comprise memory 1408 which may be non-persistent memory for temporarily storing instructions 1410 or software executed by processing circuitry 1406. Each hardware device may comprise one or more network interface controllers (NICs) 1412, also known as network interface cards, which include physical network interface 1414. Each hardware device 1402 may also include non-transitory, persistent, machine-readable storage media 1416 having stored therein software 1418 and/or instructions executable by processing circuitry 1406. Software 1418 may include any type of software including software for instantiating one or more virtualization layers 1420 (also referred to as hypervisors and shown as layers 1420-1 and 1420-2 by way of example), software to execute virtual machines 1422 as well as software allowing it to execute functions, features and/or benefits described in relation with some embodiments described herein.

Virtual machines 1422, comprise virtual processing, virtual memory, virtual networking or interface and virtual storage, and may be run by a corresponding virtualization layer 1420 or hypervisor. Example virtual machines appear in the illustration as VMs 1422-1, 1422-2, . . . 1422-$n$, and 1422-($n$+1). Different applications/application instances 1404 may be implemented on one or more of virtual machines 1422, and the implementations may be made in different ways.

During operation, processing circuitry 1406 executes software 1418 to instantiate the hypervisor or virtualization layer 1420, which may sometimes be referred to as a virtual machine monitor (VMM). Virtualization layer(s) 1420 may present a virtual operating platform that appears like networking hardware to the virtual machine(s) 1422.

As shown in FIG. 14, hardware 1402 may be a standalone network node with generic or specific components. Hardware 1402 may include or be associated with one or more antenna(s) 1424 and may implement some functions via virtualization. Alternatively, hardware 1402 may be part of a larger cluster of hardware (e.g. such as in a data center or customer premise equipment (CPE)) where many hardware nodes work together and are managed via management and orchestration (MANO) 1426, which, among others, oversees lifecycle management of applications 1404.

Virtualization of the hardware 1402 is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1422 may be a software implementation of a physical machine that runs programs as if they were executing on a physical, non-virtualized machine. Each of virtual machines 1422, and that part of hardware 1402 that executes that virtual machine, be it hardware dedicated to that virtual machine and/or hardware shared by that virtual machine with others of the virtual machines 1422, forms a separate virtual network elements (VNE).

Still in the context of NFV, Virtual Network Function (VNF) is responsible for handling specific network functions that run in one or more virtual machines 1422 on top of hardware networking infrastructure 1402 and corresponds to application 1404 in FIG. 14.

In some embodiments, one or more radio units 1430 that each include one or more transmitters 1432 and one or more receivers 1434 may be coupled to one or more antennas 1436. Radio units 1430 may communicate directly with hardware nodes 1402 via one or more appropriate network interfaces and may be used in combination with the virtual components to provide a virtual node with radio capabilities, such as a radio access node or a base station.

In some embodiments, some signaling can be effected with the use of control system 1440 which may alternatively be used for communication between the hardware nodes 1402 and radio units 1430.

Figure 15:
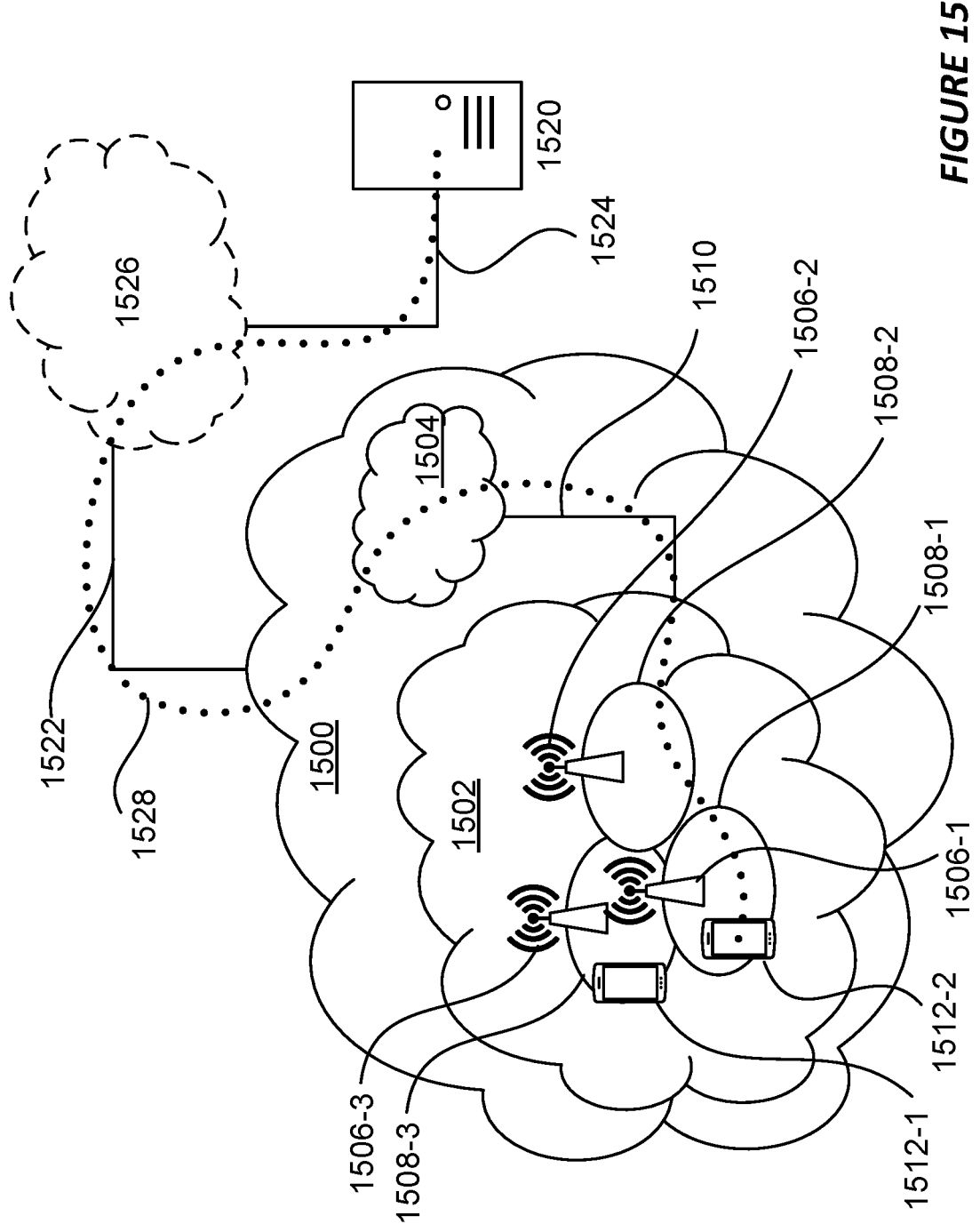
FIG. 15 is a block diagram of one embodiment of a communication system including a host computer, one or more base stations of a wireless communication network, and one or more wireless devices configured to access the host computer via the network.

FIG. 15 illustrates a telecommunication network connected via an intermediate network to a host computer in accordance with some embodiments. An example communication system includes a telecommunication network 1500, such as a 3GPP-type cellular network, which comprises an access network 1502, such as a radio access network, and a core network 1504. Access network 1502 comprises a plurality of base stations 1506-1, 1506-2, 1506-3, such as NBs, eNBs, gNBs or other types of wireless access points, each defining a corresponding coverage area 1508-1, 1508-2, 1508-3. Each base station 1506-1, 1506-2, 1506-3 is connectable to core network 1504 over a wired or wireless connection 1510. A first UE 1512-1 located in coverage area 1508-3 is configured to wirelessly connect to, or be paged by, the corresponding base station 1506-3. A second UE 1512-2 in coverage area 1508-1 is wirelessly connectable to the corresponding base station 1506-1. While a plurality of UEs 1512 (e.g., 1512-1 and 1512-2) are illustrated in this example, the disclosed embodiments are equally applicable to a situation where a sole UE 1512 is in the coverage area of a base station 1506 or where a sole UE 1512 is connecting to a corresponding base station 1506. Also, as explained above, a UE 1512 may connect (in an active state) to a combination of base stations using different RATs.

Telecommunication network 1500 is itself connected to host computer 1520, which may be embodied in the hardware and/or software of a standalone server, a cloud-implemented server, a distributed server or as processing resources in a server farm. Host computer 1520 may be under the ownership or control of a service provider or may be operated by the service provider or on behalf of the service provider. Connections 1522 and 1524 between telecommunication network 1500 and host computer 1520 may extend directly from core network 1504 to host computer 1520 or may go via an optional intermediate network 1526. Intermediate network 1526 may be one of, or a combination of more than one of, a public, private or hosted network; intermediate network 1526, if any, may be a backbone network or the Internet; in particular, intermediate network 1526 may comprise two or more sub-networks (not shown).

The communication system of FIG. 15 enables connectivity between the connected UEs 1512-1, 1512-2 and host computer 1520. The connectivity may be described as an over-the-top (OTT) connection 1528. Host computer 1520 and the connected UEs 1512-1, 1512-2 are configured to communicate data and/or signaling via OTT connection 1528, using access network 1502, core network 1504, any intermediate network 1526 and possible further infrastructure (not shown) as intermediaries. OTT connection 1528 may be transparent in the sense that the participating communication devices through which OTT connection 1528 passes are unaware of routing of uplink and downlink communications. For example, base station 1506 may not or need not be informed about the past routing of an incoming downlink communication with data originating from host computer 1520 to be forwarded (e.g., handed over) to a connected UE 1512. Similarly, base station 1506 need not be aware of the future routing of an outgoing uplink communication originating from the UE 1512 towards the host computer 1520.

Figure 16:
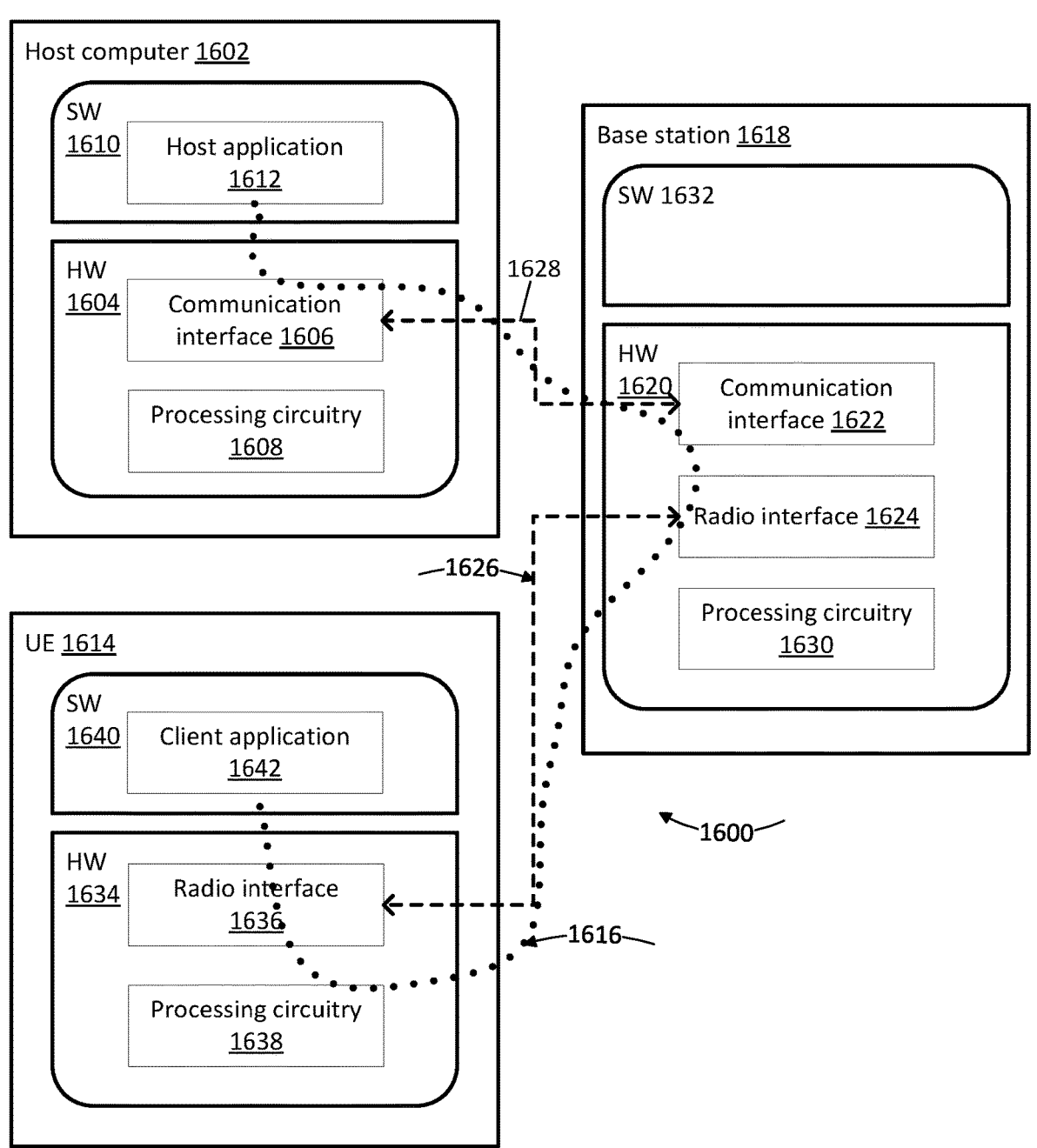
FIG. 16 is a block diagram of example embodiments of a host computer, a base station, and a wireless device.

FIG. 16 depicts a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 16.

In a communication system 1600, host computer 1602 comprises hardware 1604 including communication interface 1606 configured to set up and maintain a wired or wireless connection with an interface of a different communication device of communication system 1600. Host computer 1602 further comprises processing circuitry 1608, which may have storage and/or processing capabilities. Processing circuitry 1608 may comprise one or more programmable processors, application-specific integrated circuits, field programmable gate arrays or combinations of these (not shown) adapted to execute instructions. Host computer 1602 further comprises software 1610, which is stored in or accessible by host computer 1602 and executable by processing circuitry 1608. Software 1610 includes host application 1612. Host application 1612 may be operable to provide a service to a remote user, such as UE 1614 connecting via OTT connection 1616 terminating at UE 1614 and host computer 1602. In providing the service to the remote user, host application 1612 may provide user data which is transmitted using OTT connection 1616.

Communication system 1600 further includes base station 1618 provided in a telecommunication system and comprising hardware 1620 enabling it to communicate with host computer 1602 and with UE 1614. Base station 1618 may support one or more cells (not shown) which may provide coverage to UE 1614. The UE 1614 is, for example, configured to perform redirection failure recovery operations as disclosed herein.

Hardware 1620 of the base station 1618 may include communication interface 1622 for setting up and maintaining a wired or wireless connection with an interface of a different communication device of communication system 1600, as well as radio interface 1624 for setting up and maintaining at least wireless connection 1626 with UE 1614 located in a coverage area (not shown in FIG. 16) served by base station 1618. The wireless connection 1626 may be used to page the UE 1614, while the UE 1614 is in a dormant state and camping on a cell provided by the base station 1618. Communication interface 1622 may be configured to facilitate connection 1628 to host computer 1602. Connection 1628 may be direct, or it may pass through a core network (not shown in FIG. 16) of the telecommunication system and/or through one or more intermediate networks outside the telecommunication system. In the embodiment shown, hardware 1620 of base station 1618 further includes processing circuitry 1630, which may comprise one or more programmable processors, application-specific integrated circuits, field programmable gate arrays or combinations of these (not shown) adapted to execute instructions. Base station 1618 further has software 1632 stored internally or accessible via an external connection.

The UE 1614 is configured to use the communication system 1600, e.g., to connect to the host computer 1602. Hardware 1634 of the UE 1614 may include radio interface 1636 configured to set up and maintain wireless connection 1626 with one or more base stations serving a coverage area in which UE 1614 is currently located. Hardware 1634 of UE 1614 further includes processing circuitry 1638, which may comprise one or more programmable processors, application-specific integrated circuits, field programmable gate arrays or combinations of these (not shown) adapted to execute instructions. UE 1614 may be configured to perform a redirection procedure with redirection failure recovery processing, as disclosed herein. UE 1614 further comprises software 1640, which is stored in or accessible by UE 1614 and executable by processing circuitry 1638. Software 1640 includes client application 1642. Client application 1642 may be operable to provide a service to a human or non-human user via UE 1614, with the support of host computer 1602. In host computer 1602, an executing host application 1612 may communicate with the executing client application 1642 via OTT connection 1616 terminating at UE 1614 and host computer 1602. In providing the service to the user, client application 1642 may receive request data from host application 1612 and provide user data in response to the request data. OTT connection 1616 may transfer both the request data and the user data. Client application 1642 may interact with the user to generate the user data that it provides.

It is noted that host computer 1602, base station 1618 and UE 1614 illustrated in FIG. 16 may be similar or identical to host computer 1520, one of base stations 1506-1, 1506-2, 1506-3 and one of UEs 1512-1 and 1512-2 of FIG. 15, respectively. This is to say, the inner workings of these entities may be as shown in FIG. 16 and independently, the surrounding network topology may be that of FIG. 15.

In FIG. 16, OTT connection 1616 has been drawn abstractly to illustrate the communication between host computer 1602 and UE 1614 via base station 1618, without explicit reference to any intermediary devices and the precise routing of messages via these devices. Network infrastructure may determine the routing, which it may be configured to hide from UE 1614 or from the service provider operating host computer 1602, or both. While OTT connection 1616 is active, the network infrastructure may further take decisions by which it dynamically changes the routing (e.g., on the basis of load balancing consideration or reconfiguration of the network).

Wireless connection 1626 between UE 1614 and base station 1618 is in accordance with the teachings of the embodiments described throughout this disclosure and may be one of a plurality of connections—e.g., a DC or CA "connection" comprising two or more connections between the UE 1614. One or more of the various embodiments improve the performance of OTT services provided to UE 1614 using OTT connection 1616, in which wireless connection 1626 forms the last segment. More precisely, the teachings of these embodiments may improve the speed with which the UE 1614 can use CA or DC after entering an active state from a dormant state and thereby provide benefits such as reduced latency and improved throughput.

A measurement procedure may be provided for the purpose of monitoring data rate, latency and other factors on which the one or more embodiments improve. There may further be an optional network functionality for reconfiguring OTT connection 1616 between host computer 1602 and UE 1614, in response to variations in the measurement results. The measurement procedure and/or the network functionality for reconfiguring OTT connection 1616 may be implemented in software 1610 and hardware 1604 of host computer 1602 or in software 1640 and hardware 1634 of UE 1614, or both. In embodiments, sensors (not shown) may be deployed in or in association with communication devices through which OTT connection 1616 passes; the sensors may participate in the measurement procedure by supplying values of the monitored quantities exemplified above, or supplying values of other physical quantities from which software 1610, 1640 may compute or estimate the monitored quantities. The reconfiguring of OTT connection 1616 may include message format, retransmission settings, preferred routing etc.; the reconfiguring need not affect base station 1618, and it may be unknown or imperceptible to base station 1618. Such procedures and functionalities may be known and practiced in the art. In certain embodiments, measurements may involve proprietary UE signaling facilitating measurements by the host computer 1602 of throughput, propagation times, latency and the like. The measurements may be implemented in that software 1610 and 1640 cooperate to cause messages to be transmitted, in particular empty or "dummy" messages, using OTT connection 1616 while monitoring propagation times, errors, etc.

Figure 17:
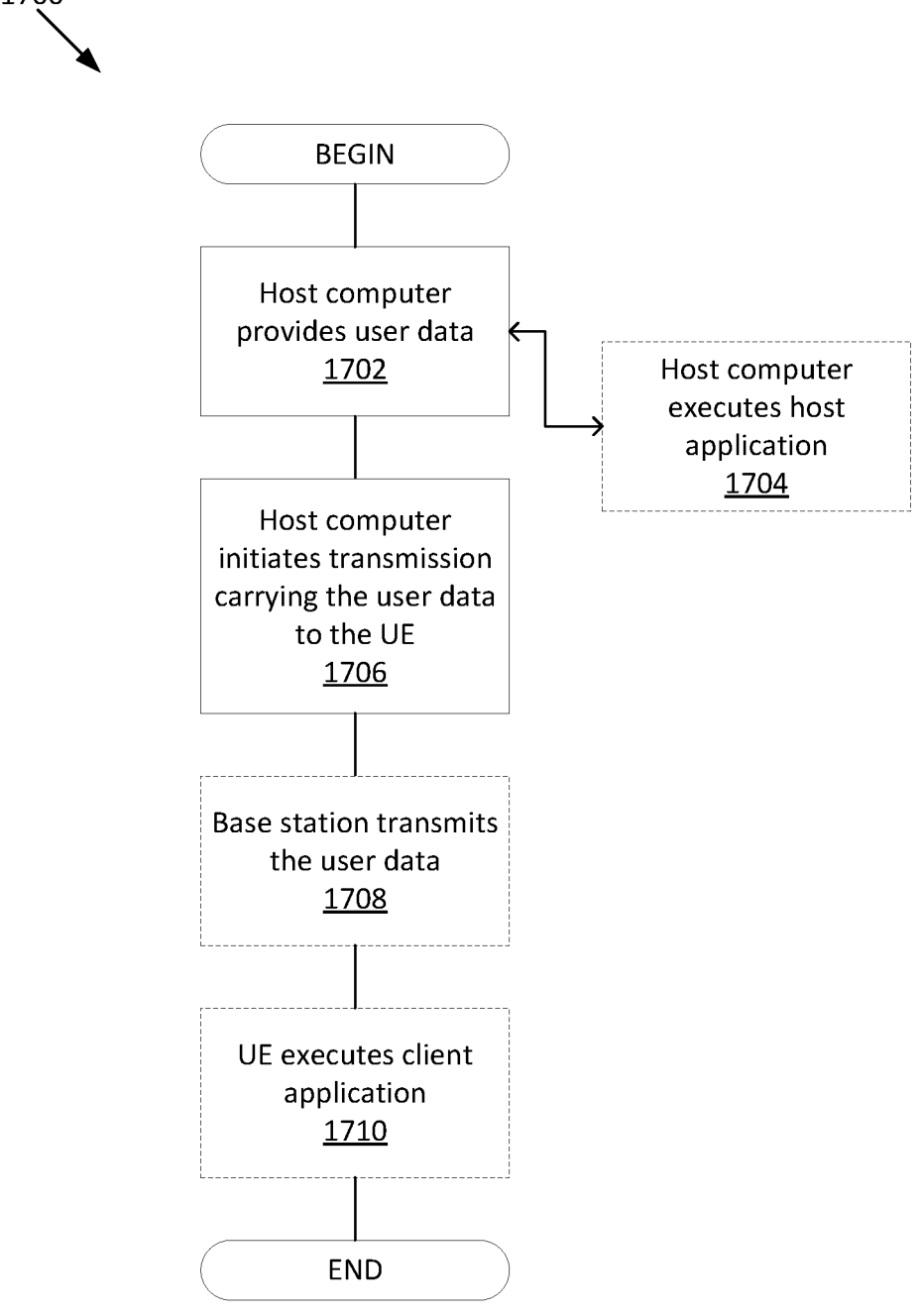
FIGS. 17-20 are logic flow diagram of example embodiments of methods of operation by various components of a communication system that includes a host computer, a base station of a wireless communication network, and a wireless device configured to access the host computer via the network.

FIG. 17 illustrates example methods 1700 implemented in a communication system including a host computer, a base station and a user equipment in accordance with some embodiments.

Specifically, FIG. 17 is a flowchart illustrating methods implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1702, the host computer provides user data. In sub-step 1704 (which may be optional) of step 1702, the host computer provides the user data by executing a host application. In step 1706, the host computer initiates a transmission carrying the user data to the UE. In step 1708 (which may be optional), the base station transmits to the UE the user data which was carried in the transmission that the host computer initiated, in accordance with the teachings of the embodiments described throughout this disclosure. In step 1710 (which may also be optional), the UE executes a client application associated with the host application executed by the host computer.

Figure 18:
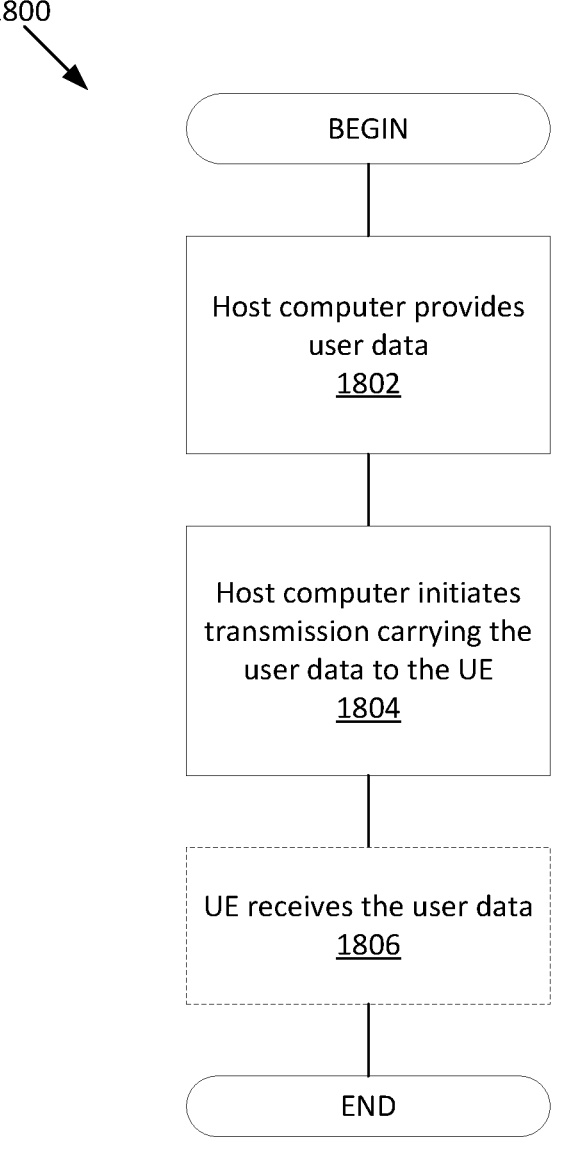

FIG. 18 illustrates example methods 1800 implemented in a communication system including a host computer, a base station and a user equipment in accordance with some embodiments.

Specifically, FIG. 18 depicts a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1802 of the method, the host computer provides user data. In an optional sub-step (not shown) the host computer provides the user data by executing a host application. In step 1804, the host computer initiates a transmission carrying the user data to the UE. The transmission may pass via the base station, in accordance with the teachings of the embodiments described throughout this disclosure. In step 1806 (which may be optional), the UE receives the user data carried in the transmission.

Figure 19:
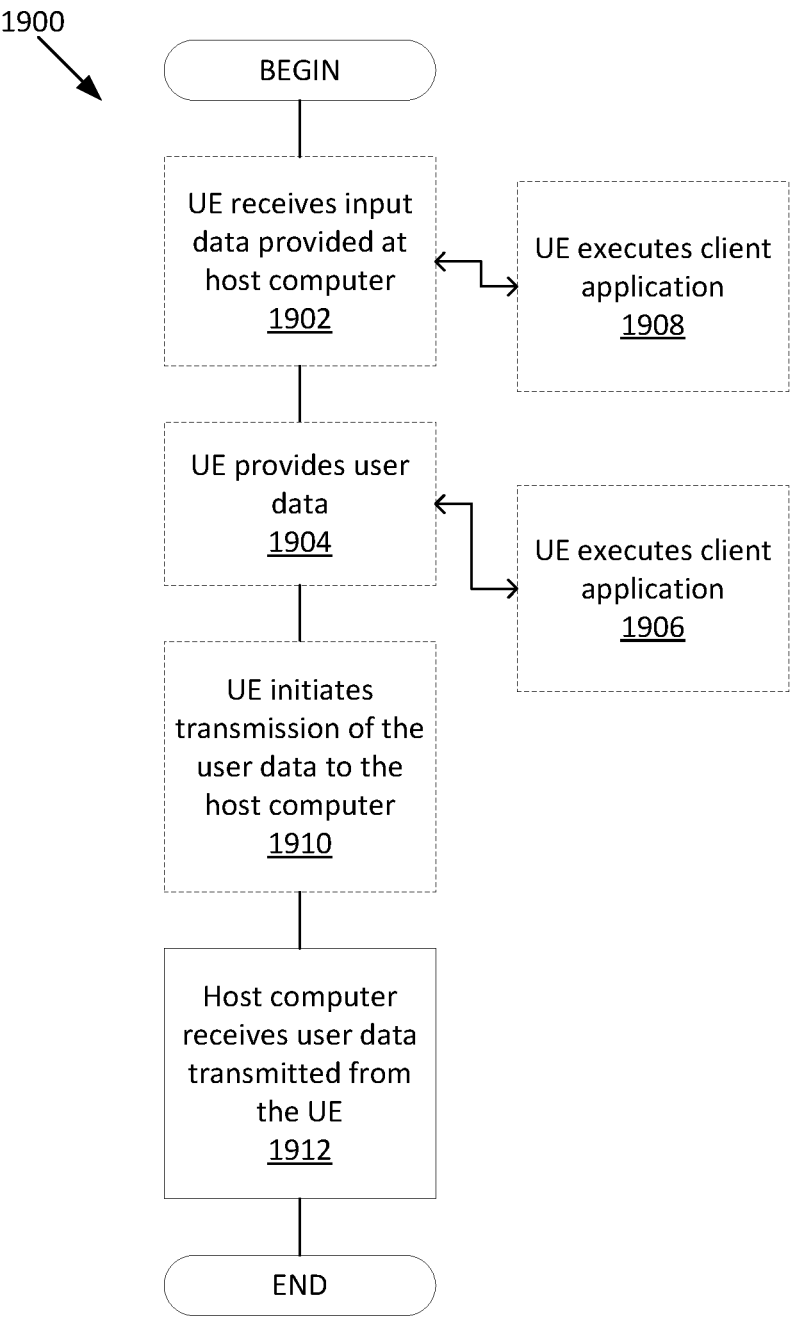

FIG. 19 illustrates example methods 1900 implemented in a communication system including a host computer, a base station and a user equipment in accordance with some embodiments.

Specifically, FIG. 19 depicts a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1902 (which may be optional), the UE receives input data provided by the host computer. Additionally, or alternatively, in step 1904, the UE provides user data. In sub-step 1906 (which may be optional) of step 1904, the UE provides the user data by executing a client application. In sub-step 1908 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1910 (which may be optional), transmission of the user data to the host computer. In step 1912 of the method, the host computer receives the user data transmitted from the UE, in accordance with the teachings of the embodiments described throughout this disclosure.

Figures 20, 21, 22:
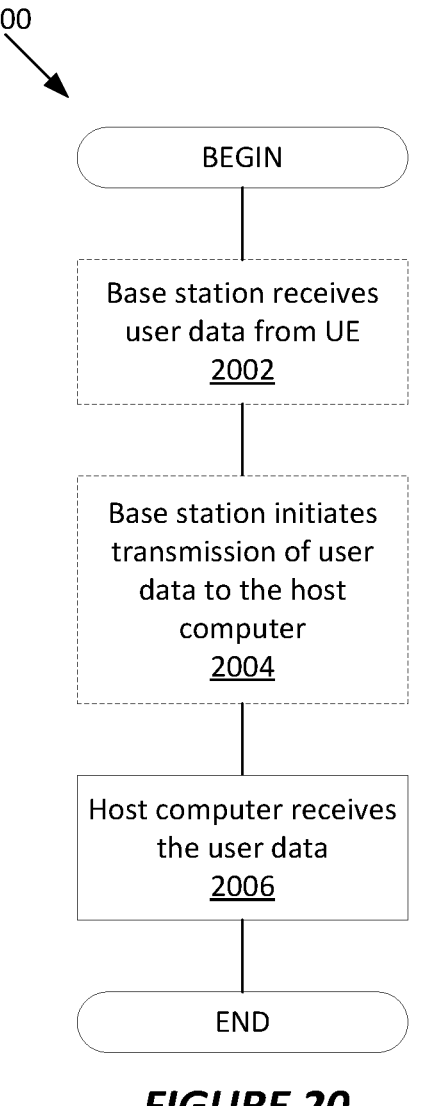
FIG. 21 is a block diagram of one embodiment of a virtualized wireless device.
FIG. 22 is a block diagram of one embodiment of a virtualized base station or other network node of a wireless communication network.

FIG. 20 illustrates example methods implemented in a communication system including a host computer, a base station and a user equipment in accordance with some embodiments.

Specifically, FIG. 20 depicts a flowchart illustrating a method 2000 implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2002 (which may be optional), in accordance with the teachings of the embodiments described throughout this disclosure, the base station receives user data from the UE. In step 2004 (which may be optional), the base station initiates transmission of the received user data to the host computer. In step 2006 (which may be optional), the host computer receives the user data carried in the transmission initiated by the base station.

FIG. 21 illustrates an example implementation of a wireless device as a virtualized wireless device 2100, such as may be used in a wireless communication network, e.g., the network 10 depicted in FIG. 12. The virtualized wireless device 2100 or "apparatus 2100" is operable to carry out the any of the other method embodiments and variations described herein for a wireless device or UE.

Apparatus 2100 includes a redirecting unit 2102 that is configured to carry out redirection procedures as described herein and is realized or otherwise instantiated using underlying processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. The redirecting unit 2102 provides the wireless-device functionality described herein, in cooperation with a failure recovery unit 2104, which is figured to perform redirection failure recovery as described herein, e.g., uplink LBT failure recovery.

FIG. 22 depicts an example of a virtualized network node 2200, also referred to as an "apparatus 2200". The apparatus 2200 is configured as a core network node, a radio access point, or another type of network node in a wireless communication network, such as the network 10 depicted in FIG. 12. In any case, the apparatus 2200 provides all or some of the network-side functionality described herein, e.g., it determines and/or provides one or more configuration parameters for a UE to use in performing a redirection procedure and/or in performing a redirection failure recovery procedure, upon failure of the redirection procedure.

Apparatus 2200 includes a determining unit 2202 that is realized or otherwise instantiated using underlying processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The determining unit 2202 determines one or more configuration parameter values for a UE to use, for preforming a redirection procedure and/or a redirection failure procedure, e.g., based on one or more factors, including, for example, any of UE capability, and network conditions, number of redirection targets, type of redirection, etc. The configuring unit 2204 configures the UE with the one or more configuration parameter values, e.g., by indicating the one more values in a release message sent to the UE.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CE Control Element
CGI Cell Global Identifier
CIR Channel Impulse Response
CP Cyclic Prefix
CPICH Common Pilot Channel
CPICH Ec/No CPICH Received energy per chip divided
   by the power density in the band
CQI Channel Quality information
C-RNTI Cell RNTI
CSI Channel State Information
DCCH Dedicated Control Channel
DCI Downlink Control Information
DL Downlink
DM Demodulation
DMRS Demodulation Reference Signal
DRB Data Radio Bearer
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
   Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Chan-
   nel
NR New Radio
OCNG OFDMA Channel Noise Generator
OFDM Orthogonal Frequency Division Multiplexing OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSCELL Primary Secondary Cell
PSS Primary Synchronization Signal
PUCCH Physical Uplink Control Channel
PUSCH Physical Uplink Shared Channel
QAM Quadrature Amplitude Modulation
RACH Random Access Channel
RAN Radio Access Network
RAT Radio Access Technology
RLF Radio Link Failure
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference
   Signal Received Power
RSRQ Reference Signal Received Quality OR Reference
   Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SMTC SS/PBCH Block Measurement Time Configura-
   tion
SNR Signal to Noise Ratio
SON Self Optimized Network
SR Scheduling Request
SRB Signaling Radio Bearer
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

EXAMPLE EMBODIMENTS

Group A

1. A method of operation by a User Equipment (UE), the method comprising:
   receiving a Radio Resource Control (RRC) release message indicating redirection of the UE; and
       attempting the redirection towards one or more indicated redirection targets, as indicated in the release message, subject to an overall limit that bounds the overall number of redirection attempts made by the UE towards the one or more redirection targets, or bounds the overall time allowed for the redirection attempts made by the UE towards the one or more indicated redirection targets; and
       upon reaching the overall limit, attempting redirection towards one or more further redirection targets, wherein at least one of the further redirection targets is not among the one or more indicated redirection targets.

2. A method of operation by a User Equipment (UE), the method comprising:
   receiving a Radio Resource Control (RRC) release message indicating redirection of the UE and directly or indirectly indicating a number of network cells or parts of cells as indicated redirection targets;
       limiting a per-target time spent by the UE in attempting the redirection towards any one of the indicated redirection targets, according to a first timer or counter that limits the number of random access attempts or associated Listen Before Talk (LBT) procedures that are permitted for the indicated redirection target before the UE is triggered to try a next one of the indicated redirection targets;
       limiting an overall time spent by the UE in attempting the redirection towards the indicated redirection targets, according to a second timer or counter that limits the overall number of random access attempts or associated LTB procedures that are permitted overall for the indicated redirection targets; and
       responsive to reaching the limit defined by the second timer or counter, selecting one or more further cells or cell parts as one or more further redirection targets, and attempting redirection towards one or more of the one or more further redirection targets.

3. A method of operation by a User Equipment (UE), the method comprising:
       the UE performing a Listen-Before-Talk (LBT) failure detection and recovery procedure during a Radio Resource Control (RRC) redirection procedure involving one or more target cells of a redirected carrier indicated in an RRC release message with redirection, wherein the UE:
       performs random access towards one or more of the targets cells, based on the UE performing a limited number of random access attempts towards any currently selected one of the target cells before selecting another one of the target cells to try, according to a first timer or counter that limits the number of LBT failures or random access failures that the UE is permitted to experience in association with attempting random access towards the currently-selected target cell; and performs, as a redirection failure recovery procedure, random access towards one or more further cells that are not necessarily among the target cells, responsive to detecting a redirection failure, wherein the UE detects the redirection failure as the UE reaching a limit on the overall number of LBT failures or random access failures that the UE is permitted to experience in the redirection procedure with respect to the target cells, or reaching a limit on the overall time the UE is permitted to expend for attempting random access with respect to the target cells.

4. A method of operation by a User Equipment (UE), the method comprising:
       performing a redirection procedure according to a first limit that bounds redirection attempts made by the UE towards each redirection target among one or more redirection targets indicated for the redirection procedure, and further according to a second limit that bounds the redirection procedure; and
       performing a redirection failure recovery procedure, responsive to reaching the second limit during performance of the redirection procedure.

5. The method of embodiment 4, further comprising performing the redirection procedure responsive to receiving a release message from a radio network node a wireless communication network, and wherein the one or more redirection targets are one or more cells or parts of cells.

6. The method of embodiment 5, wherein the redirection attempts made by the UE towards each redirection target comprise random access attempts, each random access attempt conditioned on the UE performing a Listen-Before-Talk (LBT) procedure.

7. The method of embodiment 4, wherein the first limit bounds the redirection attempts made by the UE towards each redirection target by setting a count limit on the number of unsuccessful random access attempts or unsuccessful LBT procedures, referred to as LBT failures, that the UE can experience before the UE must select a new redirection target, or by setting a time limit on how long the UE can perform random access attempts towards the redirection target before the UE must select a new redirection target.

8. The method of embodiment 6 or 7, wherein the second limit comprises an overall count limit that limits the overall number of random access attempts or LBT failures permitted for the UE during the redirection procedure before the UE must declare a redirection failure, or the second limit comprises an overall time limit on the redirection procedure.

9. The method of any of embodiments 5-8, wherein performing the redirection failure recovery procedure comprises selecting a cell of a wireless communication network for attempting access, without restriction cell selection to a list of cells or carrier frequencies indicated for the redirection procedure.

10. The method of any of embodiments 1-9, wherein at least one of the following applies: the UE receives signaling indicating one or more configuration parameter values for the UE to use for triggering a redirection failure recovery procedure while performing a redirection procedure; or the UE uses a predefined value or uses a rule to determine a value, for one or more configuration parameters used by the for triggering the redirection failure recovery procedure.

Group AA

11. A User Equipment (UE) configured for operation with respect to a wireless communication network, the UE comprising:
    processing circuitry configured to perform the operations of any of embodiments 1-9; and
    power supply circuitry configured to supply power to the UE.

12. A User Equipment (UE) comprising:
    communication interface circuitry configured to transmit and receive signals with respect to one or more Radio Access Networks (RANs) involving one or more carrier frequencies and one or more Radio Access Technologies (RATs); and
    processing circuitry operatively associated with the communication interface circuitry and configured to perform the operations of any of embodiments 1-10.

13. A wireless device configured to perform any of the steps of any of the Group A embodiments.

14. A wireless device comprising processing circuitry configured to perform any of the steps of any of the Group A embodiments.

15. A wireless device comprising:
    communication circuitry; and
    processing circuitry configured to perform any of the steps of any of the Group A embodiments.

16. A wireless device comprising:
    processing circuitry configured to perform any of the steps of any of the Group A embodiments; and
    power supply circuitry configured to supply power to the wireless device.

17. A wireless device comprising:
    processing circuitry and memory, the memory containing instructions executable by the processing circuitry whereby the wireless device is configured to perform any of the steps of any of the Group A embodiments.

18. A user equipment (UE) comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

19. A computer program comprising instructions which, when executed by at least one processor of a wireless device, causes the wireless device to carry out the steps of any of the Group A embodiments.

20. A carrier containing the computer program of embodiment 19, wherein the carrier is one of an electronic signal, optical signal, radio signal, or computer readable storage medium.

Group B

21. A method of operation by a network node of a wireless communication network, the method comprising:
    sending configuration information to a User Equipment (UE), indicating one or more configuration parameter values for the UE to use for triggering a redirection failure recovery procedure while performing a redirection procedure.

22. The method of embodiment 21, further comprising indicating the one or more configuration parameter values in a release message sent to the UE, in conjunction with releasing the UE from a connected mode.

23. The method of embodiment 22, wherein the release message is a Radio Resource Control (RRC) message sent to the UE in conjunction with releasing the UE from an RRC_CONNECTED mode.

24. The method of any of embodiments 21-23, further comprising determining the configuration information.

25. The method of any embodiments claims 21-24, wherein the configuration information defines an overall limit on the number of redirection attempts by the UE or the time spent by the UE attempting redirection, for the redirection procedure, such that the UE triggers a redirection failure recovery procedure upon reaching the overall limit.

26. The method of any of embodiments 21-25, wherein the UE performs the redirection procedure with respect to one or more indicated redirection targets, and wherein the configuration information indicates a first timer or counter that limits the number of random access attempts or associated Listen-Before-Talk (LBT) procedures that are permitted at the UE for any particular one of the one or more indicated redirection targets before the UE is triggered to try a next one of the one or more redirection targets, such that the first timer or counter limits a per-target time spent by the UE in attempting redirection towards any one of the one or more indicated redirection targets.

27. The method of embodiment 26, wherein the configuration information indicates a second timer or counter that limits the overall number of random access attempts or associated LTB procedures that are permitted at the UE for the one or more indicated redirection targets collectively, such that the second timer or counter limits an overall time spent by the UE in attempting redirection towards the one or more indicated redirection targets before the UE declares a redirection failure and triggers the redirection failure recovery procedure.

Group BB

28. A network node configured for operation in a wireless communication network, the network node comprising:
    processing circuitry configured to perform the operations of any of embodiments 11-13; and
    power supply circuitry configured to supply power to the network node.

29. A network node configured for operation in a wireless communication network, the network node comprising:
    communication interface circuitry configured to communicate directly with a User Equipment (UE) via radio communication, or to communicate indirectly with the UE, via another network node having radio circuitry for radio communication with the UE; and
    processing circuitry operatively associated with the communication interface circuitry and configured to perform the operations of any of embodiments 13-15.

30. A network node configured to perform any of the steps of any of the Group B embodiments.

31. A network node comprising processing circuitry configured to perform any of the steps of any of the Group B embodiments.

32. A network node comprising:
   communication circuitry; and
   processing circuitry configured to perform any of the steps of any of the Group B embodiments.

33. A network node comprising:
   processing circuitry configured to perform any of the steps of any of the Group B embodiments; and
   power supply circuitry configured to supply power to the radio network node.

34. A network node comprising:
   processing circuitry and memory, the memory containing instructions executable by the processing circuitry whereby the radio network node is configured to perform any of the steps of any of the Group B embodiments.

35. The network node of any of embodiments 28-34, wherein the network node is a radio network node.

36. A computer program comprising instructions which, when executed by at least one processor of a network node, causes the network node to carry out the steps of any of the Group B embodiments.

37. The computer program of embodiment 36, wherein the network node is a base station.

38. A carrier containing the computer program of any of embodiment 36, wherein the carrier is one of an electronic signal, optical signal, radio signal, or computer readable storage medium.

Group D Embodiments

39. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

40. The communication system of the previous embodiment further including the base station.

41. The communication system of the previous 2 embodiments, further including the UE, wherein the UE is configured to communicate with the base station.

42. The communication system of the previous 3 embodiments, wherein:
   the processing circuitry of the host computer is configured to execute a host application, thereby providing the user data; and
   the UE comprises processing circuitry configured to execute a client application associated with the host application.

43. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

44. The method of the previous embodiment, further comprising, at the base station, transmitting the user data.

45. The method of the previous 2 embodiments, wherein the user data is provided at the host computer by executing a host application, the method further comprising, at the UE, executing a client application associated with the host application.

46. A user equipment (UE) configured to communicate with a base station, the UE comprising a radio interface and processing circuitry configured to perform any of the previous 3 embodiments.

47. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

48. The communication system of the previous embodiment, wherein the cellular network further includes a base station configured to communicate with the UE.

49. The communication system of the previous 2 embodiments, wherein:
   the processing circuitry of the host computer is configured to execute a host application, thereby providing the user data; and
   the UE's processing circuitry is configured to execute a client application associated with the host application.

50. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

51. The method of the previous embodiment, further comprising at the UE, receiving the user data from the base station.

52. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

53. The communication system of the previous embodiment, further including the UE.

54. The communication system of the previous 2 embodiments, further including the base station, wherein the base station comprises a radio interface configured to communicate with the UE and a communication interface configured to forward to the host computer the user data carried by a transmission from the UE to the base station.

55. The communication system of the previous 3 embodiments, wherein:

the processing circuitry of the host computer is configured to execute a host application; and the UE's processing circuitry is configured to execute a client application associated with the host application, thereby providing the user data.

56. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

57. A method implemented in a communication system including a host computer, a base station and a user equipment (UE), the method comprising:

at the host computer, receiving user data transmitted to the base station from the UE, wherein the UE performs any of the steps of any of the Group A embodiments.

58. The method of the previous embodiment, further comprising, at the UE, providing the user data to the base station.

59. The method of the previous 2 embodiments, further comprising:

at the UE, executing a client application, thereby providing the user data to be transmitted; and at the host computer, executing a host application associated with the client application.

60. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

61. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

62. The communication system of the previous embodiment further including the base station.

63. The communication system of the previous 2 embodiments, further including the UE, wherein the UE is configured to communicate with the base station.

64. The communication system of the previous 3 embodiments, wherein:

the processing circuitry of the host computer is configured to execute a host application; and the UE is configured to execute a client application associated with the host application, thereby providing the user data to be received by the host computer.

65. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

66. The method of the previous embodiment, further comprising at the base station, receiving the user data from the UE.

67. The method of the previous 2 embodiments, further comprising at the base station, initiating a transmission of the received user data to the host computer.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a User Equipment (UE), the method comprising: receiving a Radio Resource Control (RRC) release message indicating redirection of the UE; attempting the redirection towards one or more indicated redirection targets, as indicated in the release message, subject to an overall limit that bounds an overall number of redirection attempts made by the UE towards the one or more indicated redirection targets, or bounds an overall time allowed for the redirection attempts made by the UE towards the one or more indicated redirection targets; upon reaching the overall limit, attempting the redirection towards one or more further redirection targets, wherein at least one of the further redirection targets is not among the one or more indicated redirection targets, and performing Listen Before Talk (LBT) with respect to different parts of a cell, with attempts being governed by a limit on a total number of attempts or on a time allowed for attempting.

2. The method of claim 1, further comprising limiting a per-target time spent by the UE in attempting the redirection towards any one of the indicated redirection targets, according to a first timer or counter that limits a number of random access attempts or associated LBT Listen Before Talk (LBT) procedures that are permitted for the indicated redirection target before the UE is triggered to try a next one of the one or more indicated redirection targets.

3. The method of claim 1, wherein attempting the redirection towards the one or more indicated redirection targets subject to the overall limit comprises: limiting the overall time spent by the UE in attempting the redirection towards the one or more indicated redirection targets, according to a second timer or counter that defines a limit on the overall number of random access attempts or associated LBT procedures that are permitted overall for the one or more indicated redirection targets; and responsive to reaching the limit defined by the second timer or counter, selecting one or more further cells or cell parts as the one or more further redirection targets, and attempting redirection towards one or more of the one or more further redirection targets.

4. The method of claim 1, wherein attempting the redirection towards a currently-selected one of the one or more indicated redirection targets comprises performing one or more random access attempts towards the currently-selected redirection target, each random access attempt conditioned on performing a Listen-Before-Talk (LBT) procedure.

5. The method of claim 4, wherein the method comprises selecting a next, remaining one of the one or more indicated redirection targets upon reaching a limit on the number of redirection attempts or the time allowed for attempting redirection towards the currently-selected redirection target.

6. The method of claim 5, wherein the limit on the number of redirection attempts comprises a limit on the number of random access attempts or associated LBT procedures permitted for the currently-selected redirection target.

7. The method of claim 1, wherein the one or more indicated redirection targets are one or more cells or parts of cells, of a wireless communication network.

8. The method of claim 1, wherein attempting redirection towards the one or more further redirection targets comprising triggering a redirection failure recovery procedure in response to reaching the overall limit for attempting redirection towards the one or more indicated redirection targets, and wherein performing the redirection failure recovery procedure comprises selecting a cell of a wireless communication network for attempting access, without restricting cell selection to a list of cells or carrier frequencies indicated in or in association with the RRC release message.

9. The method of claim 8, further comprising at least one of: receiving signaling indicating one or more configuration parameter values for the UE to use for triggering the redirection failure recovery procedure; or using a predefined value or uses a rule to determine a value, for one or more configuration parameters used by the UE for triggering the redirection failure recovery procedure.

10. A User Equipment (UE) comprising: communication interface circuitry configured for sending signals to and receiving signals from radio access nodes of a wireless communication network; and processing circuitry operatively associated with the communication interface circuitry and configured to: receive a Radio Resource Control (RRC) release message indicating redirection of the UE; attempt the redirection towards one or more indicated redirection targets, as indicated in the release message, subject to an overall limit that bounds an overall number of redirection attempts made by the UE towards the one or more redirection targets, or bounds an overall time allowed for the redirection attempts made by the UE towards the one or more indicated redirection targets; upon reaching the overall limit, attempt the redirection towards one or more further redirection targets, wherein at least one of the further redirection targets is not among the one or more indicated redirection targets; and perform Listen Before Talk (LBT) with respect to different parts of a cell, with attempts being governed by a limit on a total number of attempts or on a time allowed for attempting.

11. The UE of claim 10, wherein the processing circuitry is configured to limit a per-target time spent by the UE in attempting the redirection towards any one of the one or more indicated redirection targets, according to a first timer or counter that limits a number of random access attempts or associated LBT Listen Before Talk (LBT) procedures that are permitted for the indicated redirection target before the UE is triggered to try a next one of the one or more indicated redirection targets.

12. The UE of claim 10, wherein, for attempting the redirection towards the one or more indicated redirection targets subject to the overall limit, the processing circuitry is configured to: limit the overall time spent by the UE in attempting the redirection towards the one or more indicated redirection targets, according to a second timer or counter that defines a limit on an overall number of random access attempts or associated LBT procedures that are permitted overall for the one or more indicated redirection targets; and responsive to reaching the limit defined by the second timer or counter, select one or more further cells or cell parts as the one or more further redirection targets, and attempting the redirection towards one or more of the one or more further redirection targets.

13. The UE of claim 10, wherein, to attempt the redirection towards a currently-selected one of the one or more indicated redirection targets, the processing circuitry is configured to perform one or more random access attempts towards the currently-selected redirection target, each random access attempt conditioned on performing a Listen-Before-Talk (LBT) procedure.

14. The UE of claim 13, wherein the processing circuitry is configured to select a next, remaining one of the one or more indicated redirection targets upon reaching a limit on the number of redirection attempts or the time allowed for attempting redirection towards the currently-selected redirection target, wherein the limit on the number of redirection attempts comprises a limit on the number of random access attempts or associated LBT procedures permitted for the currently-selected redirection target.

15. The UE of claim 10, wherein the one or more indicated redirection targets are one or more cells or parts of cells, of the wireless communication network.

16. The UE of claim 10, wherein, for attempting redirection towards the one or more further redirection targets, the processing circuitry is configured to trigger a redirection failure recovery procedure in response to reaching the overall limit for attempting redirection towards the one or more indicated redirection targets, and wherein, to perform the redirection failure recovery procedure, the processing circuitry is configured to select a cell of the wireless communication network for attempting access, without restricting cell selection to a list of cells or carrier frequencies indicated in or in association with the RRC release message, and wherein the processing circuitry is configured to receive signaling indicating one or more configuration parameter values for the UE to use for triggering the redirection failure recovery procedure and/or use a predefined value or uses a rule to determine a value, for one or more configuration parameters used by the UE for triggering the redirection failure recovery procedure.

17. A method performed by a network node of a wireless communication network, the method comprising: sending configuration information to a User Equipment (UE), indicating one or more configuration parameter values for the UE to use for triggering a redirection failure recovery procedure while performing a redirection procedure, wherein the redirection procedure is to be performed by the UE with respect to one or more indicated redirection targets, and wherein the configuration information indicates a first timer or counter that limits a number of random access attempts or associated Listen-Before-Talk (LBT) procedures that are permitted at the UE for any particular one of the one or more indicated redirection targets before the UE is triggered to try a next one of the one or more redirection targets, such that the first timer or counter limits a per-target time spent by the UE in attempting redirection towards any one of the one or more indicated redirection targets.

18. The method of claim 17, further comprising indicating the one or more configuration parameter values in a release message sent to the UE, in conjunction with releasing the UE from a connected mode, wherein the release message is a Radio Resource Control (RRC) message sent to the UE in conjunction with releasing the UE from an RRC_CONNECTED mode.

19. The method of claim 17, wherein the configuration information defines an overall limit on a number of redirection attempts by the UE or the time spent by the UE attempting redirection, for the redirection procedure, such that the UE triggers a redirection failure recovery procedure upon reaching the overall limit.

20. The method of claim 17, wherein the configuration information indicates a second timer or counter that limits an overall number of random access attempts or associated LBT procedures that are permitted at the UE for the one or more indicated redirection targets collectively, such that the second timer or counter limits an overall time spent by the UE in attempting redirection towards the one or more indicated redirection targets before the UE declares a redirection failure and triggers the redirection failure recovery procedure.

21. A network node configured for operation in a wireless communication network, the network node comprising: communication interface circuitry; and processing circuitry configured to send, via the communication interface circuitry, configuration information to a User Equipment (UE), indicating one or more configuration parameter values for the UE to use for triggering a redirection failure recovery procedure while performing a redirection procedure, wherein the redirection procedure is to be performed by the UE with respect to one or more indicated redirection targets, and wherein the configuration information indicates a first timer or counter that limits a number of random access attempts or associated Listen-Before-Talk (LBT) procedures that are permitted at the UE for any particular one of the one or more indicated redirection targets before the UE is triggered to try a next one of the one or more redirection targets, such that the first timer or counter limits aper-target time spent by the UE in attempting redirection towards any one of the one or more indicated redirection targets.

22. The network node of claim 21, wherein the processing circuitry is configured to indicate the one or more configuration parameter values in a release message sent to the UE, in conjunction with releasing the UE from a connected mode.

23. The network node of claim 22, wherein the release message is a Radio Resource Control (RRC) message sent to the UE in conjunction with releasing the UE from an RRC_CONNECTED mode.

24. The network node of claim 21, wherein the configuration information defines an overall limit on a number of redirection attempts by the UE or the time spent by the UE attempting redirection, for the redirection procedure, such that the UE triggers a redirection failure recovery procedure upon reaching the overall limit.

25. The network node of claim 21, wherein the configuration information defines a limit on a number of redirection attempts made by the UE towards any particular one of one or more redirection targets indicated for the redirection procedure, or a time permitted to the UE for attempting redirection to any particular one of the one or more indicated redirection targets.

26. The network node of claim 21, wherein the configuration information indicates a second timer or counter that limits an overall number of random access attempts or associated LBT procedures that are permitted at the UE for the one or more indicated redirection targets collectively, such that the second timer or counter limits an overall time spent by the UE in attempting redirection towards the one or more indicated redirection targets before the UE declares a redirection failure and triggers the redirection failure recovery procedure.

* * * * *